(12) United States Patent
Kato et al.

(10) Patent No.: US 11,370,882 B2
(45) Date of Patent: Jun. 28, 2022

(54) RESIN PRODUCED BY POLYCONDENSATION, AND RESIN COMPOSITION

(71) Applicant: MITSUBISHI GAS CHEMICAL COMPANY, INC., Tokyo (JP)

(72) Inventors: Noriyuki Kato, Tokyo (JP); Hirohito Ishizuka, Ibaraki (JP); Munenori Shiratake, Tokyo (JP); Kentaro Ishihara, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 204 days.

(21) Appl. No.: 16/800,130

(22) Filed: Feb. 25, 2020

(65) Prior Publication Data

US 2020/0190259 A1     Jun. 18, 2020

Related U.S. Application Data

(62) Division of application No. 15/306,638, filed as application No. PCT/JP2015/063143 on May 1, 2015, now Pat. No. 10,689,486.

(30) Foreign Application Priority Data

May 7, 2014     (JP) ................. 2014-096100

(51) Int. Cl.
| | |
|---|---|
| *G02B 1/04* | (2006.01) |
| *C08G 64/16* | (2006.01) |
| *C08G 63/672* | (2006.01) |
| *C08K 5/103* | (2006.01) |
| *C08K 5/134* | (2006.01) |
| *C08G 63/64* | (2006.01) |
| *C08G 63/197* | (2006.01) |
| *C08G 63/193* | (2006.01) |
| *C08G 64/06* | (2006.01) |
| *C08K 5/00* | (2006.01) |

(52) U.S. Cl.
CPC ....... *C08G 64/1608* (2013.01); *C08G 63/193* (2013.01); *C08G 63/197* (2013.01); *C08G 63/64* (2013.01); *C08G 63/672* (2013.01); *C08G 64/06* (2013.01); *C08K 5/005* (2013.01); *C08K 5/103* (2013.01); *C08K 5/134* (2013.01); *G02B 1/04* (2013.01); *G02B 1/041* (2013.01)

(58) Field of Classification Search
CPC .......... C08G 64/1608; C08G 63/193; C08G 63/197; C08G 63/64; C08G 63/672; C08G 64/06; C08K 5/005; C08K 5/103; C08K 5/134; G02B 1/04; G02B 1/041
USPC ........................................................ 524/291
See application file for complete search history.

(56) References Cited

U.S. PATENT DOCUMENTS

| | | |
|---|---|---|
| 5,530,086 A | 6/1996 | Fuji et al. |
| 6,066,711 A | 5/2000 | Hanazawa et al. |
| 2010/0048855 A1 | 2/2010 | Kato et al. |
| 2010/0144995 A1 | 6/2010 | Kato et al. |
| 2012/0095139 A1 | 4/2012 | Yoshida et al. |
| 2012/0116000 A1 | 5/2012 | Yoshida et al. |
| 2015/0285954 A1 | 10/2015 | Ishizuka et al. |

FOREIGN PATENT DOCUMENTS

| | | |
|---|---|---|
| EP | 2 918 621 | 9/2015 |
| JP | 09-302077 | 11/1997 |
| JP | 10087800 A | * 4/1998 |
| JP | 2000-302857 | 10/2000 |
| JP | 2001-072872 | 3/2001 |

(Continued)

OTHER PUBLICATIONS

WO 2014/073496 A, machine translation, EPO espacenet. (Year: 2014).*

(Continued)

*Primary Examiner* — Josephine L Chang
(74) *Attorney, Agent, or Firm* — Greenblum & Bernstein, P.L.C.

(57) ABSTRACT

A polyester carbonate resin is provided, which includes a structural unit derived from a compound represented by general formula (1), a structural unit derived from a compound represented by general formula (2), a structural unit derived from a dicarboxylic acid or a derivative thereof, and a structural unit derived from a carbonic acid diester. The polyester carbonate can be used, e.g., in optical systems.

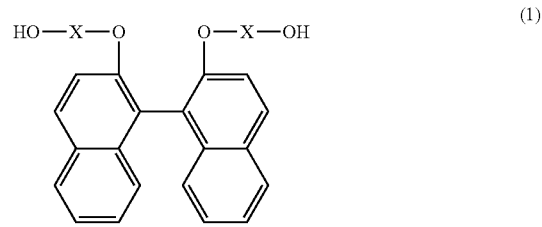

(1)

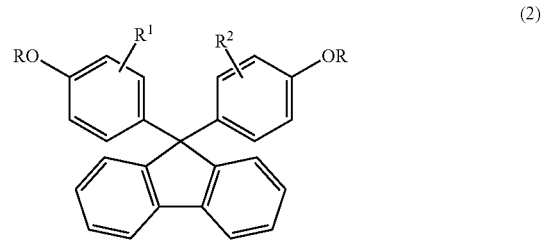

(2)

6 Claims, No Drawings

(56) References Cited

FOREIGN PATENT DOCUMENTS

| | | |
|---|---|---|
| JP | 2002-332345 | 11/2002 |
| JP | 2006-335974 | 12/2006 |
| JP | 2007-057916 | 3/2007 |
| JP | 2009-067681 | 4/2009 |
| JP | 2010-100770 | 5/2010 |
| JP | 2010-241947 | 10/2010 |
| JP | 2010-248445 | 11/2010 |
| JP | 2011-168722 | 9/2011 |
| JP | 2012-077266 | 4/2012 |
| JP | 2013-064117 | 4/2013 |
| JP | 2013-064119 | 4/2013 |
| JP | 2014-185325 | 10/2014 |
| JP | 2014-221865 | 11/2014 |
| TW | 2012-042989 | 11/2012 |
| WO | 2007/142149 | 12/2007 |
| WO | 2012-099261 | 7/2012 |
| WO | 2014/073496 | 5/2014 |

OTHER PUBLICATIONS

JP 2014-221865 A, machine translation, EPO espacenet. (Year: 2014).*

JP 10-087800 A, machine translation, EPO espacenet. (Year: 1998).*

JP 2002-332345 A, machine translation, EPO espacenet. (Year: 2002).*

International Search Report issued in Patent Application No. PCT/JP2015/063143, dated Jun. 2, 2015.

Extended European Search Report issued in Patent Application No. 15789371.0, dated Dec. 12, 2017.

\* cited by examiner

RESIN PRODUCED BY POLYCONDENSATION, AND RESIN COMPOSITION

CROSS-REFERENCE TO RELATED APPLICATIONS

The present application is a Divisional Application of U.S. application Ser. No. 15/306,638, filed Oct. 25, 2016, which is a National Stage of International Patent Application No. PCT/JP2015/063143, filed May 1, 2015, which claims priority to Japanese Application No. 2014-096100, filed May 7, 2014. The disclosure of each of the applications listed above is incorporated by reference herein in its entirety.

TECHNICAL FIELD

The present invention relates to a resin produced by polycondensation, which comprises a structural unit having a specific binaphthyl skeleton and a structural unit having a specific fluorene structure, and a resin composition.

BACKGROUND ART

As a material of optical elements to be used in optical systems of various cameras such as cameras, film integrated type cameras and video cameras, an optical glass or an optical transparent resin is used. Optical glasses are excellent in heat resistance, transparency, size stability, chemical resistance, etc., and there are various optical glasses with different refractive indexes or Abbe numbers. However, optical glasses have problems of high material costs, bad molding processability and low productivity. In particular, significantly advanced techniques and high costs are required for processing for obtaining an aspherical lens to be used for aberration correction, and this is a major obstacle from a practical viewpoint.

Contrary to the above-described optical glasses, advantageously, optical lenses made of optical transparent resins, particularly thermoplastic transparent resins can be mass-produced by injection molding, and in addition, an aspherical lens can be easily produced therefrom. Such optical lenses are currently used as camera lenses. Examples of optical transparent resins include a polycarbonate made of bisphenol A, a polymethyl methacrylate and an amorphous polyolefin.

In general, in optical systems of cameras, aberration is corrected by combining a plurality of concave lenses and convex lenses. Specifically, chromatic aberration is synthetically corrected by combining convex lenses having chromatic aberration with concave lenses having chromatic aberration whose sign is opposite to that of the chromatic aberration of the convex lenses. In this regard, the concave lenses are required to have high dispersion (i.e., a low Abbe number).

When the above-described optical transparent resins are considered from the viewpoint of high dispersion (low Abbe number), the polycarbonate made of bisphenol A has a refractive index of about 1.59 and an Abbe number of about 32, the polymethyl methacrylate has a refractive index of about 1.49 and an Abbe number of about 58, and the amorphous polyolefin has a refractive index of about 1.54 and an Abbe number of about 56. Among them, only the polycarbonate can be used as concave lenses for aberration correction, but when the Abbe number is 32, it cannot be said that sufficiently high dispersion is obtained thereby. For this reason, a novel material which can be used as concave lenses for aberration correction has been desired.

As a resin to be used for concave lenses for aberration correction, Patent Document 1 discloses a polyester resin composition obtained by copolymerization of a fluorene-based dihydroxy compound having a refractive index of about 1.66 and an Abbe number of about 20.

Next, birefringence will be described. The polycarbonate resin made of bisphenol A is widely used for optical lenses, but applications of the polycarbonate resin are limited because of high birefringence thereof as a drawback. In particular, in applications to cameras for cellular phones and digital cameras, as the resolution has been increased recently by the improvement of the pixel number, a resin material having high imaging performance and low birefringence has been desired.

Examples of methods for realizing low birefringence of resin materials include a technique of canceling positive birefringence of a composition with negative birefringence of another composition (Patent Document 5). The sign (positive or negative) of birefringence is determined by the difference between the polarizability of the polymer main chain direction and the polarizability of the polymer side chain direction. For example, a polycarbonate resin made of bisphenol A in which the polarizability of the polymer main chain direction is larger than the polarizability of the polymer side chain direction has positive birefringence, and a polycarbonate resin made of bisphenol having a fluorene structure in which the polarizability of the polymer side chain direction is larger has negative birefringence. For this reason, the component ratio of materials whose birefringence signs are opposite to each other is very important. By using a resin having low birefringence, optical distortion is reduced.

Patent Document 6 describes that use of a dicarboxylic acid having a fluorene structure as a raw material in a polyester resin is effective for reduction of birefringence. Note that carboxylic acid is a type of a compound having a hydroxyl group (Non-Patent Document 1).

Note that polymers having a 1,1'-binaphthalene structure are described in Patent Documents 2, 3 and 4. However, Patent Documents 2 and 3 do not disclose any resin having a structural unit derived from a compound represented by general formula (1). Patent Document 4 describes a polymer comprising a structural unit represented by general formula (A), but it is not a polymer comprising a structural unit having a fluorene structure. Further, the patent document does not disclose whether the sign of birefringence of the polymer comprising a structural unit represented by general formula (A) is positive or negative.

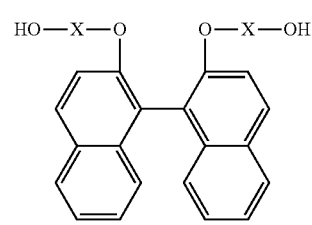

(1)

(X represents a $C_{1-10}$ alkylene group.)

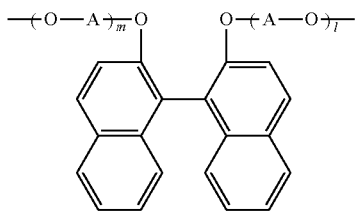

(A)

(In the formula, A represents a $C_{2-4}$ alkylene group. The naphthalene ring may be substituted with a substituent, and substituted substituents may be subjected to ring condensation. m and l respectively represent an integer of $0 \leq m \leq 50$ and an integer of $0 \leq l \leq 50$.)

CITATION LIST

Patent Document

Patent Document 1: Japanese Laid-Open Patent Publication No. 2006-335974
Patent Document 2: Japanese Laid-Open Patent Publication No. 2000-302857
Patent Document 3: Japanese Laid-Open Patent Publication No. 2001-72872
Patent Document 4: Japanese Laid-Open Patent Publication No. 2002-332345
Patent Document 5: International Publication WO2007/142149 pamphlet
Patent Document 6: Japanese Laid-Open Patent Publication No. 2013-64119

Non-Patent Document

Non-Patent Document 1: Renji Okazaki, "Iwanami Lecture Series, Introduction to Modern Chemistry <9> Characteristics and Molecular Transform of Organic Compounds", Iwanami Shoten, 2004, page 96 (in Japanese)

SUMMARY

Technical Problem

The purpose of the present invention is to provide a resin having excellent optical characteristics such as a high refractive index and a low Abbe number in view of the above-described problems.

Solution to Problem

The present inventors diligently made researches and found that a resin obtained by using a specific monomer particularly provides optically superior performance, for example, a high refractive index and a low Abbe number.

Specifically, the present invention is, for example, as follows:

[1] A polyester resin, comprising which comprises:

a structural unit derived from a compound represented by general formula (1) below:

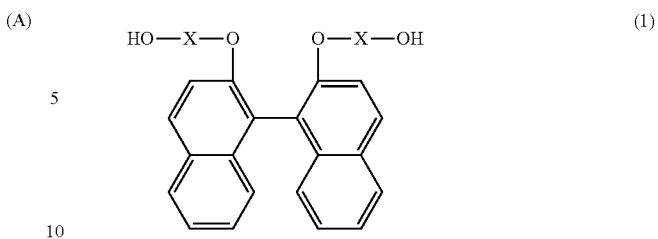

wherein X represents a $C_{1-10}$ alkylene group;
a structural unit derived from a compound represented by general formula (2) below:

(2)

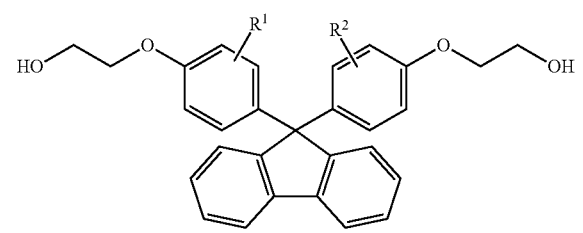

wherein $R^1$ and $R^2$ each independently represent a hydrogen atom, a $C_{1-20}$ alkyl group, a $C_{1-20}$ alkoxyl group, a $C_{5-20}$ cycloalkyl group, a $C_{5-20}$ cycloalkoxyl group, a $C_{6-20}$ aryl group or a $C_{6-20}$ aryloxy group and R represents a hydrogen atom or a $C_{1-20}$ hydroxyalkyl group; and
a structural unit derived from a dicarboxylic acid or a derivative thereof.

[2] The polyester resin according to item [1], wherein the compound represented by general formula (2) is a compound represented by general formula (2a) below:

(2a)

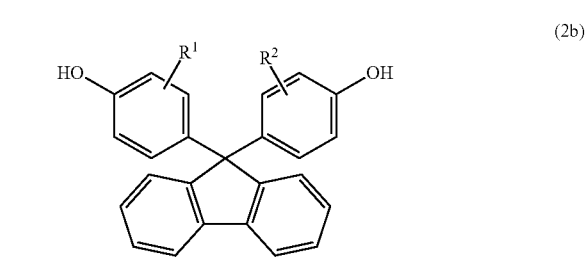

wherein $R^1$ and $R^2$ are as defined in item [1], or a compound represented by general formula (2b) below:

(2b)

wherein $R^1$ and $R^2$ are as defined in item [1].

[3] The polyester resin according to item [1] or [2], wherein the dicarboxylic acid or a derivative thereof is naphthalene dicarboxylic acid, terephthalic acid, isophthalic acid, dicarboxylic acid having a fluorene group or an ester thereof.

[3-1] The polyester resin according to item [3], wherein the dicarboxylic acid having a fluorene group is a dicarboxylic acid represented by general formula (3) below:

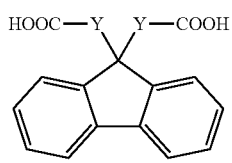

(3)

wherein Ys each independently represent a single bond, a $C_{1-20}$ alkyl group, a $C_{1-20}$ alkoxyl group, a $C_{5-20}$ cycloalkyl group, a $C_{5-20}$ cycloalkoxyl group, a $C_{6-20}$ aryl group or a $C_{6-20}$ aryloxy group.

[4] The polyester resin according to any one of items [1] to [3-1], wherein in structural units derived from a dihydroxy compound in the polyester resin, the ratio of the structural unit derived from the compound represented by general formula (1) is 5 to 95 mol % and the ratio of the structural unit derived from the compound represented by general formula (2) is 2.5 to 47.5 mol %.

[5] The polyester resin according to any one of items [1] to [4], further comprising a structural unit derived from glycol, wherein in the structural units derived from the dihydroxy compound in the polyester resin, the ratio of the structural unit derived from glycol is 5 to 70 mol %.

[5-1] A polyester resin obtained by copolymerization of:
a compound represented by general formula (1) below:

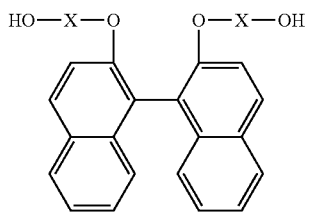

(1)

wherein X represents a $C_{1-10}$ alkylene group;
a compound represented by general formula (2) below:

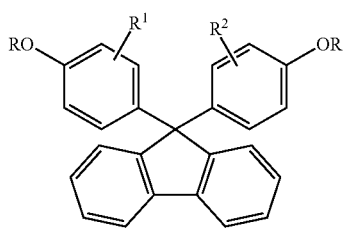

(2)

wherein $R^1$ and $R^2$ each independently represent a hydrogen atom, a $C_{1-20}$ alkyl group, a $C_{1-20}$ alkoxyl group, a $C_{5-20}$ cycloalkyl group, a $C_{5-20}$ cycloalkoxyl group, a $C_{6-20}$ aryl group or a $C_{6-20}$ aryloxy group and R represents a hydrogen atom or a $C_{1-20}$ hydroxyalkyl group; and
a dicarboxylic acid or a derivative thereof.

[6] An optical member comprising the polyester resin according to any one of items [1] to [5-1].

[7] The optical member according to item [6], which is an optical lens of a single-lens reflex camera, a digital still camera, a video camera, a cellular phone with a camera, a disposable camera, a telescope, binoculars, a microscope or a projector.

[8] A polyester carbonate resin, comprising:
a structural unit derived from a compound represented by general formula (1) below:

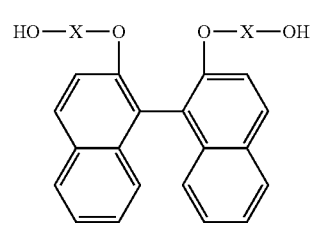

(1)

wherein X represents a $C_{1-10}$ alkylene group;
a structural unit derived from a compound represented by general formula (2) below:

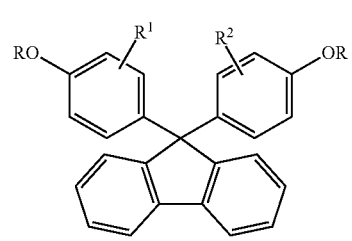

(2)

wherein $R^1$ and $R^2$ each independently represent a hydrogen atom, a $C_{1-20}$ alkyl group, a $C_{1-20}$ alkoxyl group, a $C_{5-20}$ cycloalkyl group, a $C_{5-20}$ cycloalkoxyl group, a $C_{6-20}$ aryl group or a $C_{6-20}$ aryloxy group and R represents a hydrogen atom or a $C_{1-20}$ hydroxyalkyl group;
a structural unit derived from a dicarboxylic acid or a derivative thereof; and
a structural unit derived from a carbonic acid diester.

[9] The polyester carbonate resin according to item [8], wherein the compound represented by general formula (2) is a compound represented by general formula (2a) below:

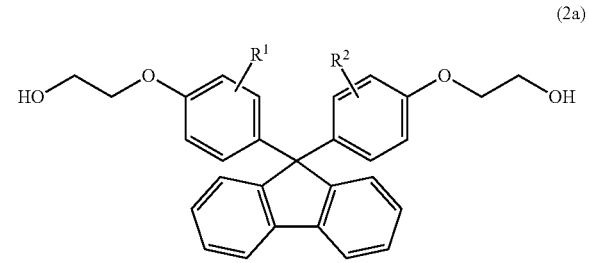

(2a)

wherein $R^1$ and $R^2$ are as defined in item [8], or a compound represented by general formula (2b) below:

(2b)

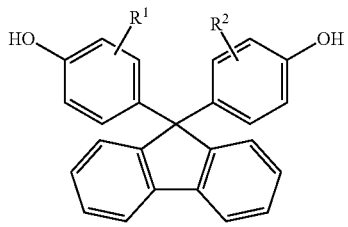

wherein $R^1$ and $R^2$ are as defined in item [8].

[10] The polyester carbonate resin according to item [8] or [9], wherein the dicarboxylic acid or a derivative thereof is naphthalene dicarboxylic acid, terephthalic acid, isophthalic acid, dicarboxylic acid having a fluorene group or an ester thereof.

[10-1] The polyester carbonate resin according to item [10], wherein the dicarboxylic acid having a fluorene group is a dicarboxylic acid represented by general formula (3) below:

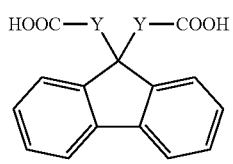 (3)

wherein Ys each independently represent a single bond, a $C_{1-20}$ alkyl group, a $C_{1-20}$ alkoxyl group, a $C_{5-20}$ cycloalkyl group, a $C_{5-20}$ cycloalkoxyl group, a $C_{6-20}$ aryl group or a $C_{6-20}$ aryloxy group.

[10-2] The polyester carbonate resin according to any one of items [8] to [10-1], wherein the carbonic acid diester is selected from the group consisting of diphenyl carbonate, ditolyl carbonate, bis(chlorophenyl) carbonate, m-cresyl carbonate, dimethyl carbonate, diethyl carbonate, dibutyl carbonate and dicyclohexyl carbonate.

[11] The polyester carbonate resin according to any one of items [8] to [10-2], wherein in structural units derived from a dihydroxy compound in the polyester carbonate resin, the ratio of the structural unit derived from the compound represented by general formula (1) is 5 to 95 mol % and the ratio of the structural unit derived from the compound represented by general formula (2) is 2.5 to 47.5 mol %.

[11-1] A polyester carbonate resin obtained by copolymerization of:

a compound represented by general formula (1) below:

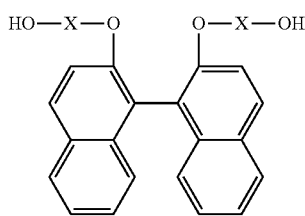 (1)

wherein X represents a $C_{1-10}$ alkylene group;

a compound represented by general formula (2) below:

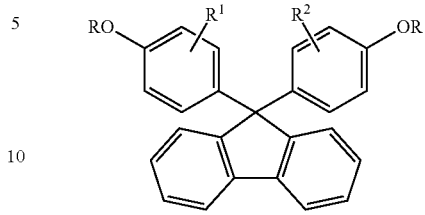 (2)

wherein $R^1$ and $R^2$ each independently represent a hydrogen atom, a $C_{1-20}$ alkyl group, a $C_{1-20}$ alkoxyl group, a $C_{5-20}$ cycloalkyl group, a $C_{5-20}$ cycloalkoxyl group, a $C_{6-20}$ aryl group or a $C_{6-20}$ aryloxy group and R represents a hydrogen atom or a $C_{1-20}$ hydroxyalkyl group;

a carbonic acid diester; and a dicarboxylic acid or a derivative thereof.

[12] The polyester carbonate resin according to any one of items [8] to [11-1], which has a refractive index of 1.645 to 1.660.

[13] The polyester carbonate resin according to any one of items [8] to [12], which has a polystyrene equivalent weight-average molecular weight (Mw) of 14,000 to 100,000.

[14] An optical member comprising the polyester carbonate resin according to any one of items [8] to [13].

[15] The optical member according to item [14], which is an optical lens of a single-lens reflex camera, a digital still camera, a video camera, a cellular phone with a camera, a disposable camera, a telescope, binoculars, a microscope or a projector.

[16] A polycarbonate resin, comprising:

a structural unit derived from a compound represented by general formula (1) below:

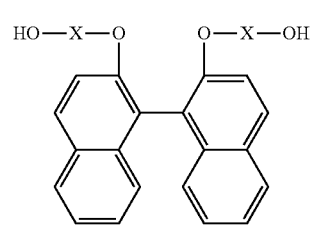 (1)

wherein X represents a $C_{1-10}$ alkylene group; and a structural unit derived from a compound represented by general formula (2) below:

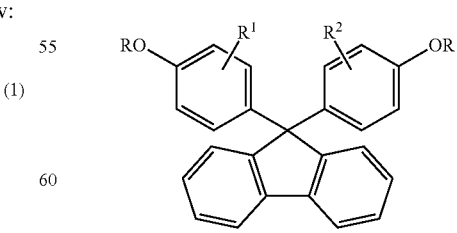 (2)

wherein $R^1$ and $R^2$ each independently represent a hydrogen atom, a $C_{1-20}$ alkyl group, a $C_{1-20}$ alkoxyl group, a $C_{5-20}$ cycloalkyl group, a $C_{5-20}$ cycloalkoxyl group, a $C_{6-20}$ aryl group or a $C_{6-20}$ aryloxy group and R represents a hydrogen atom or a $C_{1-20}$ hydroxyalkyl group, the polycarbonate resin having a phenol content of 0.1 to 3000 ppm.

[17] A polycarbonate resin, comprising:
a structural unit derived from a compound represented by general formula (1) below:

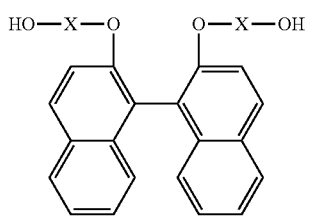
(1)

wherein X represents a $C_{1-10}$ alkylene group; and
a structural unit derived from a compound represented by general formula (2) below:

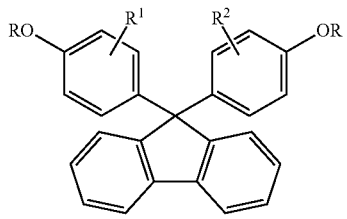
(2)

wherein $R^1$ and $R^2$ each independently represent a hydrogen atom, a $C_{1-20}$ alkyl group, a $C_{1-20}$ alkoxyl group, a $C_{5-20}$ cycloalkyl group, a $C_{5-20}$ cycloalkoxyl group, a $C_{6-20}$ aryl group or a $C_{6-20}$ aryloxy group and R represents a hydrogen atom or a $C_{1-20}$ hydroxyalkyl group, the polycarbonate resin having a carbonic acid diester content of 0.1 to 1000 ppm.

[18] A resin composition, which comprises:
a polycarbonate resin comprising:
a structural unit derived from a compound represented by general formula (1) below:

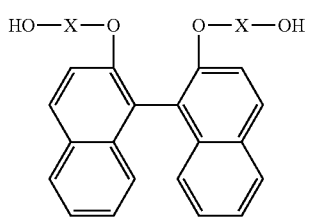
(1)

wherein X represents a $C_{1-10}$ alkylene group; and
a structural unit derived from a compound represented by general formula (2) below:

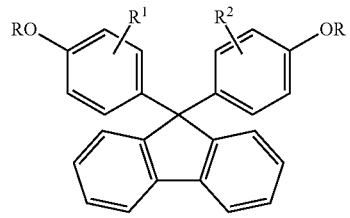
(2)

wherein $R^1$ and $R^2$ each independently represent a hydrogen atom, a $C_{1-20}$ alkyl group, a $C_{1-20}$ alkoxyl group, a $C_{5-20}$ cycloalkyl group, a $C_{5-20}$ cycloalkoxyl group, a $C_{6-20}$ aryl group or a $C_{6-20}$ aryloxy group and R represents a hydrogen atom or a $C_{1-20}$ hydroxyalkyl group; and
an antioxidant; and/or
a mold release agent.

[19] The resin composition according to item [18], wherein the antioxidant is pentaerythritol tetrakis[3-(3,5-di-tert-butyl-4-hydroxyphenyl)propionate].

[20] The resin composition according to item [18] or [19], wherein the mold release agent is an ester of an alcohol and a fatty acid.

[20-1] The resin composition according to item [20], wherein the ester of an alcohol and a fatty acid is monoglyceride stearate or monoglyceride laurate.

[21] A polycarbonate resin composition, comprising:
a polycarbonate resin comprising a structural unit derived from a compound represented by general formula (1) below:

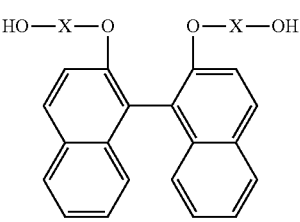
(1)

wherein X represents a $C_{1-10}$ alkylene group; and
a polycarbonate resin comprising a structural unit derived from a compound represented by general formula (2) below:

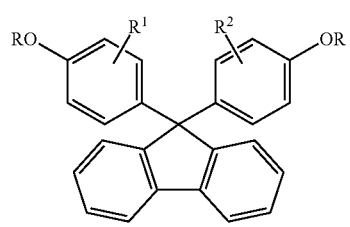
(2)

wherein $R^1$ and $R^2$ each independently represent a hydrogen atom, a $C_{1-20}$ alkyl group, a $C_{1-20}$ alkoxyl group, a $C_{5-20}$ cycloalkyl group, a $C_{5-20}$ cycloalkoxyl group, a $C_{6-20}$ aryl group or a $C_{6-20}$ aryloxy group and R represents a hydrogen atom or a $C_{1-20}$ hydroxyalkyl group, the polycarbonate resin composition having a phenol content of 0.1 to 3000 ppm.

[22] A polycarbonate resin composition, comprising:
a polycarbonate resin comprising a structural unit derived from a compound represented by general formula (1) below:

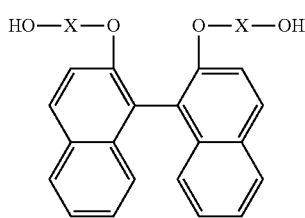

(1)

wherein X represents a $C_{1-10}$ alkylene group; and a polycarbonate resin comprising a structural unit derived from a compound represented by general formula (2) below:

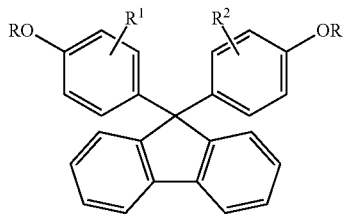

(2)

wherein $R^1$ and $R^2$ each independently represent a hydrogen atom, a $C_{1-20}$ alkyl group, a $C_{1-20}$ alkoxyl group, a $C_{5-20}$ cycloalkyl group, a $C_{5-20}$ cycloalkoxyl group, a $C_{6-20}$ aryl group or a $C_{6-20}$ aryloxy group and R represents a hydrogen atom or a $C_{1-20}$ hydroxyalkyl group, the polycarbonate resin composition having a carbonic acid diester content of 0.1 to 1000 ppm.

[23] The resin composition according to item [20] or [21], further comprising an antioxidant and/or a mold release agent.

[24] The resin composition according to item [23], wherein the antioxidant is pentaerythritol tetrakis[3-(3,5-di-tert-butyl-4-hydroxyphenyl)propionate].

[25] The resin composition according to item [22] or [23], wherein the mold release agent is an ester of an alcohol and a fatty acid.

[25-1] The resin composition according to item [25], wherein the ester of an alcohol and a fatty acid is monoglyceride stearate or monoglyceride laurate.

<1> A resin produced by polycondensation of:

a compound having a binaphthyl skeleton represented by general formula (1):

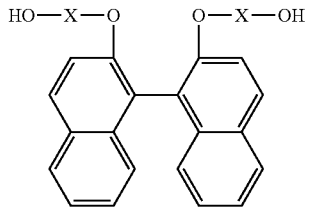

(1)

wherein X represents a $C_{1-10}$ alkylene group; and a compound having a fluorene skeleton represented by general formula (4):

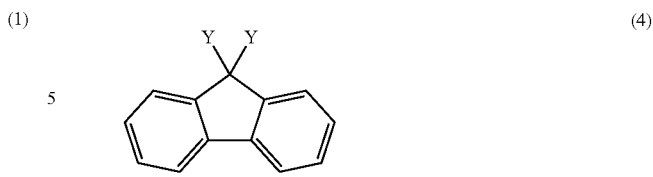

(4)

wherein Y represents an organic group having 1 to 40 carbon atoms and 1 to 4 oxygen atoms, which has at least one functional group selected from a hydroxyl group, a hydroxycarbonyl group, an alkoxycarbonyl group, an acyloxycarbonyl group and a halogenated carbonyl group, in the condition of (a) with or without combined use of a compound having 2 or more functional groups which are at least one selected from a hydroxyl group, a hydroxycarbonyl group, an alkoxycarbonyl group, an acyloxycarbonyl group and a halogenated carbonyl group, and (b) with or without use of a carbonic acid diester.

<2> A resin composition obtained by mixing:

(a) a resin produced by polycondensation of a compound having a binaphthyl skeleton represented by general formula (1) in the condition of with or without combined use of a compound having 2 or more functional groups which are at least one type selected from a hydroxyl group, a hydroxycarbonyl group, an alkoxycarbonyl group, an acyloxycarbonyl group and a halogenated carbonyl group, and with or without use of a carbonic acid diester; and (b) a resin produced by polycondensation of a compound having a fluorene skeleton represented by general formula (4) in the condition of with or without combined use of a compound having 2 or more functional groups which are at least one type selected from a hydroxyl group, a hydroxycarbonyl group, an alkoxycarbonyl group, an acyloxycarbonyl group and a halogenated carbonyl group, and with or without use of a carbonic acid diester.

<3> The resin according to item <1> or the resin composition according to item <2>, wherein the compound represented by general formula (4) is a compound represented by general formula (2a):

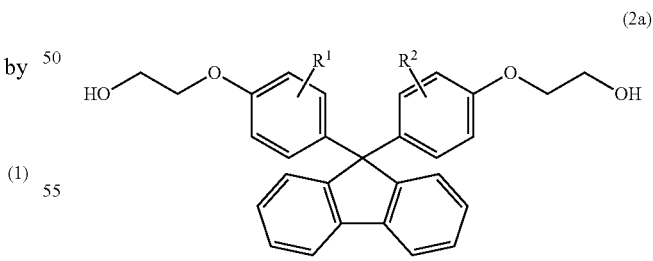

(2a)

wherein $R^1$ and $R^2$ each independently represent a hydrogen atom, a $C_{1-20}$ alkyl group, a $C_{1-20}$ alkoxyl group, a $C_{5-20}$ cycloalkyl group, a $C_{5-20}$ cycloalkoxyl group, a $C_{6-20}$ aryl group or a $C_{6-20}$ aryloxy group.

<4> The resin according to item <1> or the resin composition according to item <2>, wherein the compound represented by general formula (4) is a compound represented by general formula (2b):

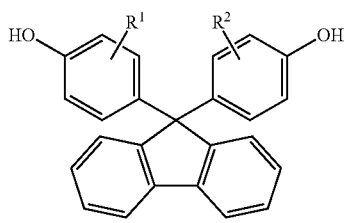

(2b)

wherein $R^1$ and $R^2$ each independently represent a hydrogen atom, a $C_{1-20}$ alkyl group, a $C_{1-20}$ alkoxyl group, a $C_{5-20}$ cycloalkyl group, a $C_{5-20}$ cycloalkoxyl group, a $C_{6-20}$ aryl group or a $C_{6-20}$ aryloxy group.

<5> The resin according to item <1> or the resin composition according to item <2>, wherein the compound represented by general formula (4) is a compound represented by general formula (3):

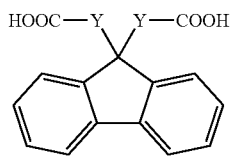

(3)

wherein Ys each independently represent a single bond, a $C_{1-20}$ alkyl group, a $C_{1-20}$ alkoxyl group, a $C_{5-20}$ cycloalkyl group, a $C_{5-20}$ cycloalkoxyl group, a $C_{6-20}$ aryl group or a $C_{6-20}$ aryloxy group.

Advantageous Effects of the Invention

According to the present invention, it is possible to obtain a resin having excellent optical characteristics such as a high refractive index and a low Abbe number.

DESCRIPTION OF EMBODIMENTS

The resin of the embodiment of the present invention is a resin produced by polycondensation using at least a compound represented by general formula (1) and a compound represented by general formula (2) as raw materials.

The resin produced by polycondensation is preferably polyester, polyester carbonate or polycarbonate.

The structural unit derived from the compound represented by general formula (1) contributes to a high refractive index, and in addition, contributes to reduction of the Abbe number more than the structural unit derived from the compound represented by general formula (2). The structural unit derived from the compound represented by general formula (2) contributes to a high refractive index and a low Abbe number, and in addition, has effects of reducing a birefringence value derived from the compound represented by general formula (1) and reducing optical distortion of an optical molded body.

Optical characteristics such as the refractive index, Abbe number and birefringence value are significantly affected by chemical structures of structural units, and the influence related to the matter as to whether a chemical bond between structural units is an ester bond or carbonate bond is relatively small.

In the compound represented by general formula (1), the functional group which contributes to polycondensation is an alcoholic hydroxyl group.

In the compound represented by general formula (2), a typical example of the functional group which contributes to polycondensation is a hydroxyl group, and examples thereof include an alcoholic hydroxyl group, a phenolic hydroxyl group and a carboxylic hydroxyl group.

The resin of the embodiment has a structural unit derived from a dihydroxy compound (excluding dicarboxylic acid) and a structural unit derived from a dicarboxylic acid, but it does not mean that raw materials of the resin are limited to the dihydroxy compound and the dicarboxylic acid. For example, in addition to the dicarboxylic acid, an ester, an acid anhydride and an acid halide of the dicarboxylic acid may also be used as raw materials.

In this specification, a component derived from the dihydroxy compound in the resin is sometimes referred to as a "dihydroxy component" or "dihydroxy structural unit", and a component derived from the dicarboxylic acid is sometimes referred to as a "dicarboxylic acid component" or "dicarboxylic acid structural unit". Further, in this specification, unless otherwise indicated, carboxylic acid is a type of hydroxy compound and dicarboxylic acid is a type of dihydroxy compound.

In another embodiment, a resin composition obtained by mixing a resin obtained by polycondensation of at least the compound represented by general formula (1) and a resin obtained by polycondensation of at least the compound represented by general formula (2) is also provided. Accordingly, the resin composition contains the structural unit derived from the compound represented by general formula (1) and the structural unit derived from the compound represented by general formula (2).

Optical characteristics such as the refractive index, Abbe number and birefringence value are significantly affected by structures of these structural units, and the influence related to the matter as to whether the structural units exist in one molecule as in the case of copolymers or exist in a plurality of molecules as in the case of mixtures is relatively small.

<Compound Represented by General Formula (1)>

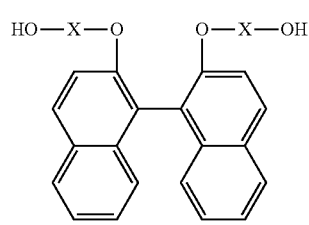

(1)

(X represents a $C_{1-10}$ alkylene group.)

Examples of the dihydroxy compound represented by general formula (1) include 2,2'-bis(hydroxymethoxy)-1,1'-binaphthalene, 2,2'-bis(2-hydroxyethoxy)-1,1'-binaphthalene, 2,2'-bis(3-hydroxypropyloxy)-1,1'-binaphthalene and 2,2'-bis(4-hydroxybutoxy)-1,1'-binaphthalene. Among them, 2,2'-bis(2-hydroxyethoxy)-1,1'-binaphthalene is preferably used.

<Compound Represented by General Formula (2)>

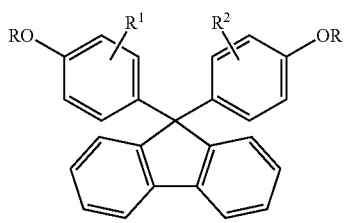

[In formula (2), $R^1$ and $R^2$ each independently represent a hydrogen atom, a $C_{1-20}$ alkyl group, a $C_{1-20}$ alkoxyl group, a $C_{5-20}$ cycloalkyl group, a $C_{5-20}$ cycloalkoxyl group, a $C_{6-20}$ aryl group or a $C_{6-20}$ aryloxy group and R represents a hydrogen atom or a $C_{1-20}$ hydroxyalkyl group.]

Among compounds represented by general formula (2), a compound having a fluorene structure represented by general formula (2a) or (2b) is preferably used. It is sufficient when at least one of such compounds is used, and two or more of them may be used in combination.

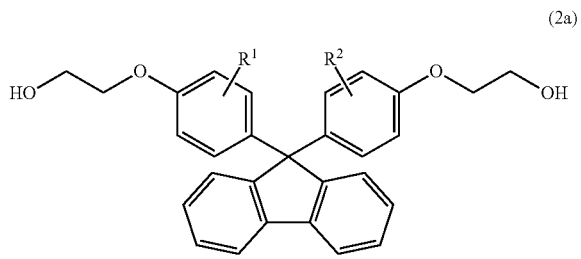

(In formula (2a), $R^1$ and $R^2$ each independently represent a hydrogen atom, a $C_{1-20}$ alkyl group, a $C_{1-20}$ alkoxyl group, a $C_{5-20}$ cycloalkyl group, a $C_{5-20}$ cycloalkoxyl group, a $C_{6-20}$ aryl group or a $C_{6-20}$ aryloxy group.)

As $R^1$ and $R^2$, preferred is a hydrogen atom, a $C_{1-12}$ alkyl group or a $C_{6-12}$ aryl group; more preferred is a hydrogen atom, a methyl group, an ethyl group, a propyl group, an isopropyl group, a butyl group, an isobutyl group, a sec-butyl group, a tert-butyl group, a cycloheptyl group, a cyclopropyl group or a phenyl group; and particularly preferred is a hydrogen atom, a methyl group or a phenyl group.

Examples of the dihydroxy compound represented by formula (2a) include 9,9-bis(4-(2-hydroxyethoxy)phenyl)fluorene, 9,9-bis(4-(2-hydroxyethoxy)-3-methylphenyl)fluorene, 9,9-bis(4-(2-hydroxyethoxy)-3,5-dimethylphenyl)fluorene, 9,9-bis(4-(2-hydroxyethoxy)-3-tert-butylphenyl)fluorene, 9,9-bis(4-(2-hydroxyethoxy)-3-isopropylphenyl)fluorene, 9,9-bis(4-(2-hydroxyethoxy)-3-cyclohexylphenyl)fluorene and 9,9-bis(4-(2-hydroxyethoxy)-3-phenylphenyl)fluorene. Among them, 9,9-bis(4-(2-hydroxyethoxy)phenyl)fluorene is preferably used.

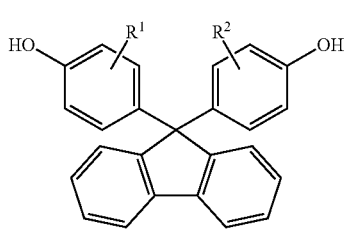

(In formula (2b), $R^1$ and $R^2$ each independently represent a hydrogen atom, a $C_{1-20}$ alkyl group, a $C_{1-20}$ alkoxyl group, a $C_{5-20}$ cycloalkyl group, a $C_{5-20}$ cycloalkoxyl group, a $C_{6-20}$ aryl group or a $C_{6-20}$ aryloxy group.)

As $R^1$ and $R^2$, preferred is a hydrogen atom, a $C_{1-12}$ alkyl group or a $C_{6-12}$ aryl group; more preferred is a hydrogen atom, a methyl group, an ethyl group, a propyl group, an isopropyl group, a butyl group, an isobutyl group, a sec-butyl group, a tert-butyl group, a cycloheptyl group, a cyclopropyl group or a phenyl group; and particularly preferred is a hydrogen atom or a methyl group.

Examples of the dihydroxy compound represented by formula (2b) include 9,9-bis(4-hydroxyphenyl)fluorene, 9,9-bis(4-hydroxy-3-methylphenyl)fluorene, 9,9-bis(4-hydroxy-3-ethylphenyl)fluorene, 9,9-bis(4-hydroxy-3-n-propylphenyl)fluorene, 9,9-bis(4-hydroxy-3-isopropylphenyl)fluorene, 9,9-bis(4-hydroxy-3-n-butylphenyl)fluorene, 9,9-bis(4-hydroxy-3-sec-butylphenyl)fluorene, 9,9-bis(4-hydroxy-3-tert-butylphenyl)fluorene, 9,9-bis(4-hydroxy-3-cyclohexylphenyl)fluorene, 9,9-bis(4-hydroxy-2-phenylphenyl)fluorene, 9,9-bis(4-hydroxy-3-phenylphenyl)fluorene and 9,9-bis[4-hydroxy-3-(3-methylphenyl)phenyl]fluorene. Among them, 9,9-bis(4-hydroxy-3-phenylphenyl)fluorene and 9,9-bis(4-hydroxy-3-methylphenyl)fluorene are preferred. These compounds may be used solely, or two or more of them may be used in combination.

As described above, the resin of the present invention is preferably polyester, polyester carbonate or polycarbonate. Hereinafter, these preferred resins will be respectively described in detail.

1. Polycarbonate Resin

The polycarbonate resin of the embodiment is a polycarbonate resin having: a structural unit derived from a compound represented by general formula (1) (hereinafter sometimes referred to as "structural unit (A)"); and a structural unit derived from a compound represented by general formula (2) (excluding carboxylic acid) (hereinafter sometimes referred to as "structural unit (B)"). In the polycarbonate resin, the structural units are bound to each other via a carbonate bond.

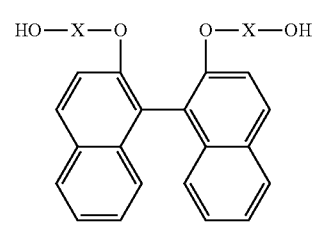

[In formula (1), X represents a $C_{1-10}$ alkylene group.]

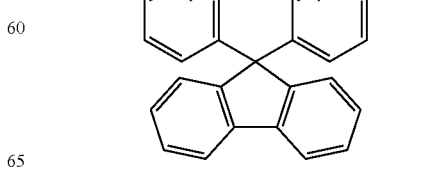

[In formula (2):

R¹ and R² each independently represent a hydrogen atom, a $C_{1-20}$ alkyl group, a $C_{1-20}$ alkoxyl group, a $C_{5-20}$ cycloalkyl group, a $C_{5-20}$ cycloalkoxyl group, a $C_{6-20}$ aryl group or a $C_{6-20}$ aryloxy group; and R represents a hydrogen atom or a $C_{1-20}$ hydroxyalkyl group.]

As the compound represented by general formula (2) (excluding carboxylic acid), a compound represented by general formula (2a) and a compound represented by general formula (2b) can be suitably used.

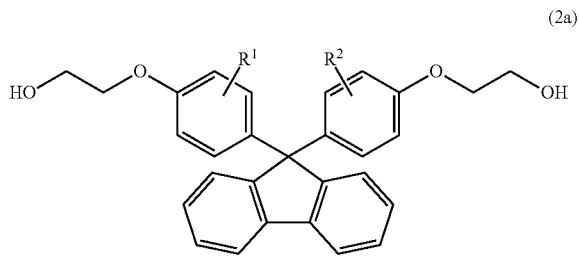

(2a)

(In formula (2a), R¹ and R² are as defined with respect to formula (2) above.)

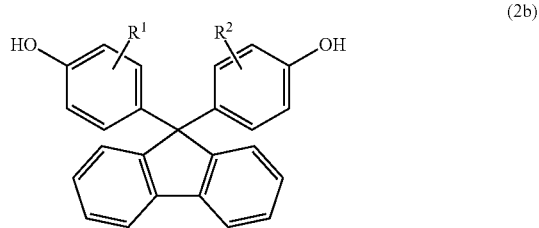

(2b)

(In formula (2b), R¹ and R² are as defined with respect to formula (2) above.)

Note that details of the compound represented by general formula (2a) or (2b) are as described above.

As dihydroxy components, in addition to the compound of general formula (1) and the compound of general formula (2) (excluding carboxylic acid), an aromatic dihydroxy compound and an aliphatic dihydroxy compound can be used in combination.

Examples of the aromatic dihydroxy compound and the aliphatic dihydroxy compound include 4,4-bis(4-hydroxyphenyl)propane [=bisphenol A], 1,1-bis(4-hydroxyphenyl)-1-phenylethane [=bisphenol AP], 2,2-bis(4-hydroxyphenyl)hexafluoropropane [=bisphenol AF], 2,2-bis(4-hydroxyphenyl)butane [=bisphenol B], bis(4-hydroxyphenyl)diphenylmethane [=bisphenol BP], bis(4-hydroxy-3-methylphenyl)propane [=bisphenol C], 1,1-bis(4-hydroxyphenyl)ethane [=bisphenol E], bis(4-hydroxyphenyl)methane [=bisphenol F], bis(2-hydroxyphenyl)methane, 2,2-bis(4-hydroxy-3-isopropylphenyl)propane [=bisphenol G], 1,3-bis(2-(4-hydroxyphenyl)-2-propyl)benzene [=bisphenol M], bis(4-hydroxyphenyl)sulfone [=bisphenol S], 1,4-bis(2-(4-hydroxyphenyl)-2-propyl)benzene [=bisphenol P], 2,2-bis(4-hydroxy-3-phenylphenyl]propane [=bisphenol PH], 1,1-bis(4-hydroxyphenyl)-3,3,5-trimethylcyclohexane [=bisphenol TMC], 1,1-bis(4-hydroxyphenyl)cyclohexane [=bisphenol Z], 1,1-bis(4-hydroxy-3-methylphenyl)cyclohexane (bisphenol OCZ) and 4,4-bisphenol.

(1) Polycarbonate resin comprising a structural unit derived from a compound represented by general formula (2a)

In a preferred embodiment, the polycarbonate resin comprises a structural unit (A) derived from a compound represented by general formula (1) and a structural unit derived from a compound represented by general formula (2a) (hereinafter sometimes referred to as "structural unit (C)").

The ratio of the total of the carbonate unit induced from the structural unit (A) and the carbonate unit induced from the structural unit (C) is preferably 50 mol % or more, more preferably 80 mol % or more, particularly preferably 90 mol % or more, and most preferably 100 mol % relative to all the carbonate units constituting the polycarbonate resin. The polycarbonate resin may contain a structural unit other than the structural units (A) and (C).

The molar ratio between the structural unit (A) and the structural unit (C) (A/C) is preferably 20/80 to 99/1, more preferably 30/70 to 95/5, and particularly preferably 40/60 to 90/10.

The ratio of the carbonate unit induced from the structural unit (A) is preferably 1 to 99 mol % relative to all the carbonate units constituting the polycarbonate resin.

The ratio of the carbonate unit induced from the structural unit (A) is more preferably 30 to 90 mol %, and even more preferably 40 to 80 mol % relative to all the carbonate units constituting the polycarbonate resin.

The polystyrene equivalent weight-average molecular weight (Mw) of the polycarbonate resin is preferably 20000 to 200000. The polystyrene equivalent weight-average molecular weight (Mw) is more preferably 25000 to 120000, even more preferably 25000 to 60000, and particularly preferably 40000 to 60000.

When Mw is less than 20000, a molded body becomes fragile and therefore it is undesirable. When Mw is more than 200000, the melt viscosity increases, resulting in difficulty in taking out a resin from a mold at the time of molding, and in addition, the flowability is reduced, resulting in difficulty in injection molding in a molten state, and therefore it is undesirable.

The polycarbonate resin may have a structure of either a random copolymer, block copolymer or alternating copolymer.

The refractive index (nD) of the polycarbonate resin at 23° C. at a wavelength of 589 nm is preferably 1.640 to 1.680, more preferably 1.645 to 1.675, and even more preferably 1.650 to 1.670. The above-described polycarbonate resin has a high refractive index (nD) and is suitable as an optical lens material. The refractive index can be measured by the method of JIS-K-7142 using a film having a thickness of 0.1 mm and an Abbe's refractometer.

The Abbe number (v) of the polycarbonate resin is preferably 24 or less, more preferably 23 or less, and even more preferably 22 or less. The Abbe number can be calculated from refractive indexes at wavelengths of 486 nm, 589 nm and 656 nm at 23° C., using the below-described formula:

$$v=(nD-1)/(nF-nC)$$

nD: refractive index at a wavelength of 589 nm
nC: refractive index at a wavelength of 656 nm
nF: refractive index at a wavelength of 486 nm When using this resin for injection molding, the glass transition temperature (Tg) is preferably 95 to 180° C., more preferably 110 to 170° C., even more preferably 115 to 160° C., and particularly preferably 125 to 145° C. When Tg is lower than 95° C., the operating temperature range is narrowed, and therefore it is undesirable. When Tg is higher than 180° C., the melting temperature of the resin increases, decomposition and coloring of the resin tend to be easily caused, and therefore it is undesirable. Further, when the glass transition temperature of the resin is too high, in the case of using a widely-used mold temperature controller, the difference between the mold temperature and the glass transition temperature of the resin increases. For this reason, it is difficult to use a resin having a too high glass transition temperature for applications which require exact surface accuracy of products, and therefore it is undesirable.

As an index of thermal stability for resisting heating at the time of injection molding, the 5% weight reduction temperature (Td) of the polycarbonate resin measured at a temperature raising rate of 10° C./min is preferably 350° C. or higher. When the 5% weight reduction temperature is lower than 350° C., the resin is thermally decomposed significantly at the time of molding and it is difficult to obtain a good molded body, and therefore it is undesirable.

Regarding the polycarbonate resin, the orientation birefringence ($\Delta n$) that is a scale of the amount of birefringence is preferably $1.0 \times 10^{-3}$ or less, more preferably $0.8 \times 10^{-3}$ or less, even more preferably $0.3 \times 10^{-3}$ or less, and particularly preferably $0.2 \times 10^{-3}$ or less.

Regarding $\Delta n$, a cast film having a thickness of 0.1 mm is cut into a 5.0×5.0 cm square; after that, both the ends of the film are sandwiched between chucks (distance between the chucks: 3.0 cm); the film is stretched 1.5-fold at a temperature of Tg of the polycarbonate resin+5° C.; the phase difference (Re) at 589 nm is measured using an ellipsometer M-220 manufacture by JASCO Corporation; and after that, $\Delta n$ can be obtained from the below-described formula:

$$\Delta n = Re/d$$

$\Delta n$: orientation birefringence
Re: phase difference
d: thickness

Regarding signs of the birefringence ($\Delta n$), it is represented by the below-described formula using the refractive index in the film stretching direction (n//) and the refractive index in the direction perpendicular to the stretching direction (n⊥), and the case where $\Delta n$ is positive is referred to as "positive birefringence" and the case where $\Delta n$ is negative is referred to as "negative birefringence".

$$\Delta n = n// - n\perp$$

In the polycarbonate resin, phenol produced at the time of the production and carbonic acid diester which is unreacted and remains are present as impurities. The phenol content in the polycarbonate resin is preferably 0.1 to 3000 ppm, more preferably 0.1 to 2000 ppm, and particularly preferably 1 to 1000 ppm, 1 to 800 ppm, 1 to 500 ppm or 1 to 300 ppm. Further, the carbonic acid diester content in the polycarbonate resin is preferably 0.1 to 1000 ppm, more preferably 0.1 to 500 ppm, and particularly preferably 1 to 100 ppm. By adjusting the amounts of phenol and carbonic acid diester contained in the polycarbonate resin, a resin having physical properties appropriate for purposes can be obtained. The adjustment of the phenol content and the carbonic acid diester content can be suitably carried out by changing conditions for polycondensation and apparatuses. The adjustment can also be carried out by changing conditions for the extrusion process after polycondensation.

When the content of phenol or carbonic acid diester is more than the above-described ranges, it may cause problems such as reduction in the strength of a resin molded body obtained and generation of odor. Meanwhile, when the content of phenol or carbonic acid diester is less than the above-described ranges, it may cause reduction in the plasticity of a resin at the time of melting.

The total light transmittance of an optical molded body obtained by using the polycarbonate resin is preferably 85% or more, and more preferably 88% or more, and is comparable to those of a bisphenol A-type polycarbonate resin, etc.

Moreover, to the polycarbonate resin, an antioxidant, a mold release agent, an ultraviolet absorber, a flowability improving agent, a crystal nucleating agent, a toughening agent, a dye, an antistatic agent, an antimicrobial agent or the like may be added.

(2) Method for producing a polycarbonate resin comprising a structural unit derived from a compound represented by general formula (2a)

The polycarbonate resin having a structural unit derived from a compound represented by general formula (2a) can be produced by the melt polycondensation method using a compound represented by general formula (1), a compound represented by general formula (2a) and a carbonate precursor such as a carbonic acid diester in the presence or absence of a basic compound catalyst or a transesterification catalyst or a mixed catalyst made of both of them.

Examples of the carbonic acid diester to be used in the reaction include diphenyl carbonate, ditolyl carbonate, bis(chlorophenyl) carbonate, m-cresyl carbonate, dimethyl carbonate, diethyl carbonate, dibutyl carbonate and dicyclohexyl carbonate. Among them, diphenyl carbonate is particularly preferred. The carbonic acid diester is used at a ratio of preferably 0.97 to 1.20 mol, and more preferably 0.98 to 1.10 mol relative to 1 mol of the total of the dihydroxy compounds. When the amount of the carbonic acid diester is not within these ranges, for example, problems that a resin does not have a desired molecular weight, and that an unreacted raw material remains in a resin, resulting in reduction in optical characteristics may be caused.

Examples of the basic compound catalyst particularly include an alkali metal compound, an alkaline earth metal compound and a nitrogen-containing compound.

Examples of the alkali metal compound include an organic salt, inorganic salt, oxide, hydroxide, hydride or alkoxide of an alkali metal, etc. Specific examples thereof include sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium tetraphenylborate, sodium benzoate, potassium benzoate, cesium benzoate, lithium benzoate, disodium hydrogen phosphate, dipotassium hydrogen phosphate, dilithium hydrogen phosphate, disodium phenyl phosphate, a disodium salt, dipotassium salt, dicesium salt or dilithium salt of bisphenol A, and a sodium salt, potassium salt, cesium salt or lithium salt of phenol. Among them, sodium hydrogen carbonate is preferred because an inexpensive high-purity sodium hydrogen carbonate having high catalytic activity is distributed.

Examples of the alkaline earth metal compound include an organic salt, inorganic salt, oxide, hydroxide, hydride or alkoxide of an alkaline earth metal, etc. Specific examples thereof include magnesium hydroxide, calcium hydroxide, strontium hydroxide, barium hydroxide, magnesium hydrogen carbonate, calcium hydrogen carbonate, strontium hydrogen carbonate, barium hydrogen carbonate, magnesium carbonate, calcium carbonate, strontium carbonate, barium carbonate, magnesium acetate, calcium acetate, strontium acetate, barium acetate, magnesium stearate, calcium stearate, calcium benzoate and magnesium phenyl phosphate.

Examples of the nitrogen-containing compound include quaternary ammonium hydroxides and salts thereof, and amines. Specific examples thereof include: quaternary ammonium hydroxides having an alkyl group, aryl group or the like such as tetramethylammonium hydroxide, tetraethylammonium hydroxide, tetrapropylammonium hydroxide, tetrabutylammonium hydroxide and trimethylbenzylammonium hydroxide; tertiary amines such as triethylamine, dimethylbenzylamine and triphenylamine; secondary amines such as diethylamine and dibutylamine; primary amines such as propylamine and butylamine; imidazoles such as 2-methylimidazole, 2-phenylimidazole and benzimidazole; and bases or basic salts such as ammonia, tetramethylammonium borohydride, tetrabutylammonium borohydride, tetrabutylammonium tetraphenylborate and tetraphenylammonium tetraphenylborate.

As the transesterification catalyst, salts of zinc, tin, zirconium, lead, etc. are preferably used. These substances may be used solely, or two or more of them may be used in combination.

As the transesterification catalyst, zinc acetate, zinc benzoate, zinc 2-ethylhexanoate, tin(II) chloride, tin(IV) chloride, tin(II) acetate, tin(IV) acetate, dibutyltin dilaurate, dibutyltin oxide, dibutyltin dimethoxide, zirconium acetylacetonato, zirconium oxyacetate, zirconium tetrabutoxide, lead(II) acetate, lead(IV) acetate or the like is specifically used.

These catalysts are used at a ratio of $1 \times 10^{-9}$ to $1 \times 10^{-3}$ mol, and preferably $1 \times 10^{-7}$ to $1 \times 10^{-4}$ mol relative to 1 mol of the total of the dihydroxy compounds.

Regarding the catalyst, two or more types of such catalysts may be used in combination. Further, the catalyst itself may be added directly, or may be dissolved in a solvent such as water and phenol and then added.

In the melt polycondensation method, using the aforementioned raw materials and catalyst, melt polycondensation is carried out while removing a by-product by means of the transesterification reaction under heating conditions and under ordinary pressure or reduced pressure. The catalyst may be present from the start of the reaction together with the raw materials, or may be added in the middle of the reaction.

In the case of melt polycondensation in this composition system, after the compounds represented by general formula (1) and general formula (2a) and the carbonic acid diester are melted in a reactor, the reaction may be performed with a monohydroxy compound by-produced being retained, but not distilled away. When the reaction is performed with the monohydroxy compound by-produced being retained, but not distilled away, the reaction time is 20 minutes to 240 minutes, preferably 40 minutes to 180 minutes, and particularly preferably 60 minutes to 150 minutes. In this regard, when the monohydroxy compound by-produced is distilled away immediately after it is produced, the content of a high-molecular-weight body in the polycarbonate resin finally obtained is decreased. Preferred reaction time may vary depending on a reaction scale.

The melt polycondensation reaction may be either a continuous type or a batch type. The reaction apparatus to be used for performing the reaction may be a vertical apparatus equipped with an anchor type stirring blade, max blend stirring blade, helicalribbon type stirring blade or the like, or a horizontal apparatus equipped with a paddle blade, lattice blade, spectacle-shaped blade or the like, or an extruder-type apparatus equipped with a screw. Further, use of these reaction apparatuses in combination is suitably carried out in consideration of the viscosity of a polymerized product.

In the method for producing the polycarbonate resin, after the polymerization reaction is completed, in order to maintain thermal stability and hydrolytic stability, the catalyst may be removed or deactivated, but is not necessarily required to be deactivated. When the catalyst is deactivated, a method for deactivating a catalyst by means of addition of a publicly-known acidic substance can be suitably carried out. As the acidic substance, specifically, esters such as butyl benzoate; aromatic sulfonic acids such as p-toluenesulfonic acid; aromatic sulfonic acid esters such as butyl p-toluenesulfonate and hexyl p-toluenesulfonate; phosphoric acids such as phosphorous acid, phosphoric acid and phosphonic acid; phosphorous acid esters such as triphenyl phosphite, monophenyl phosphite, diphenyl phosphite, diethyl phosphite, di-n-propyl phosphite, di-n-butyl phosphite, di-n-hexyl phosphite, dioctyl phosphite and monooctyl phosphite; phosphoric acid esters such as triphenyl phosphate, diphenyl phosphate, monophenyl phosphate, dibutyl phosphate, dioctyl phosphate and monooctyl phosphate; phosphonic acids such as diphenylphosphonic acid, dioctylphosphonic acid and dibutylphosphonic acid; phosphonic acid esters such as diethyl phenylphosphonate; phosphines such as triphenyl phosphine and bis(diphenylphosphino)ethane; boric acids such as boric acid and phenylboric acid; aromatic sulfonates such as dodecylbenzenesulfonic acid tetrabutylphosphonium salt; organic halides such as stearic acid chloride, benzoyl chloride and p-toluenesulfonic acid chloride; alkyl sulfates such as dimethyl sulfate; organic halides such as benzyl chloride; etc. are preferably used. From the viewpoint of effects of a deactivating agent, stability against the resin, etc., p-toluene or butyl sulfonate is particularly preferred. These deactivating agents are used in an amount of 0.01 to 50 times, and preferably 0.3 to 20 times the molar quantity of the catalyst. When the amount is less than 0.01 times the molar quantity of the catalyst, the deactivating effect is insufficient and therefore it is undesirable. When the amount is more than 50 times the molar quantity of the catalyst, heat resistance of the resin is reduced and a molded body tends to be easily colored, and therefore it is undesirable.

The addition of the deactivating agent can be carried out by means of kneading, and either a continuous type or a batch type may be employed. The temperature at the time of kneading is preferably 200 to 350° C., more preferably 230 to 300° C., and particularly preferably 250 to 270° C. As the kneading machine, an extruder is suitably used in the case of the continuous type method, and Labo Plastomill or a kneader is suitably used in the case of the batch type method. Examples of the extruder include a single screw extruder, a twin screw extruder, a multi-screw extruder, etc. To the extruder, for example, a gear pump for performing stable quantification of the resin discharge amount can be suitably provided. The atmosphere pressure for melting and kneading the resin composition is not particularly limited, and ordinary pressure or reduced pressure, for example, a pressure ranging from ordinary pressure (760 mmHg) to 0.1 mmHg is preferred in terms of antioxidation and removal of decomposed materials and low boiling point components such as phenol. The extruder may be either a vent-type extruder or a non-vent-type extruder, but from the viewpoint of quality improvement of extruded products, preferred is a vent-type extruder. The pressure at a vent port (vent pressure) may be either ordinary pressure or reduced pressure, but for example, it may be a pressure ranging from ordinary pressure (760 mmHg) to 0.1 mmHg, and it is preferably a pressure of about 100 to 0.1 mmHg, and more preferably a pressure of about 50 to 0.1 mmHg in terms of antioxidation and removal of decomposed materials and low boiling point components such as phenol. Further, hydrogenation and devolatilization may also be carried out for the purpose of more efficiently reducing low boiling point components such as phenol.

Kneading of the deactivating agent may be carried out immediately after the polymerization reaction is completed, or may be carried out after the resin after the polymerization is pelletized. Further, in addition to the deactivating agent, other additives (antioxidant, mold release agent, ultraviolet absorber, flowability improving agent, crystal nucleating agent, toughening agent, dye, antistatic agent, antimicrobial agent, etc.) may also be added in a similar manner.

After the catalyst is deactivated (in the case where the deactivating agent is not added, after the polymerization reaction is completed), a process of devolatilizing and removing a low boiling point compound in the polymer under a pressure of 0.1 to 1 mmHg and at a temperature of 200 to 350° C. may be carried out. The temperature at the time of devolatilizing and removing is preferably 230 to 300° C., and more preferably 250 to 270° C. In this process, a horizontal apparatus equipped with a stirring blade having excellent surface renewal ability such as a paddle blade, a lattice blade and a spectacle-shaped blade, or a thin film evaporator is suitably used.

It is desired that the content of foreign materials in the polycarbonate resin is as small as possible, and filtration of a melting raw material, filtration of a catalyst solution, etc. are suitably carried out. The mesh of the filter is preferably 5 μm or less, and more preferably 1 μm or less. Moreover, filtration of the produced resin using a polymer filter is suitably carried out. The mesh of the polymer filter is preferably 100 μm or less, and more preferably 30 μm or less. Further, the process of obtaining a resin pellet should definitely be carried out in a low-dust environment, which is preferably Class 6 or lower, and more preferably Class 5 or lower.

(3) Optical Molded Body Obtained by Using Polycarbonate Resin

An optical molded body can be produced using the above-described polycarbonate resin. It is molded according to any method, for example, the injection molding method, compression molding method, extrusion molding method, solution casting method or the like. The polycarbonate resin of the embodiment is excellent in moldability and heat resistance, and therefore can be advantageously used particularly for optical lenses which require injection molding. At the time of molding, the polycarbonate resin of the embodiment can be mixed with another resin such as another polycarbonate resin and a polyester resin to be used. In addition, additives such as an antioxidant, a processing stabilizer, a light stabilizer, a heavy metal deactivator, a flame retardant, a lubricant, an antistatic agent, a surfactant, an antimicrobial agent, a mold release agent, an ultraviolet absorber, a plasticizer and a compatibilizer may be mixed therewith.

Examples of the antioxidant include triethylene glycol-bis[3-(3-tert-butyl-5-methyl-4-hydroxyphenyl)propionate], 1,6-hexanediol-bis[3-(3,5-di-tert-butyl-4-hydroxyphenyl) propionate], pentaerythritol tetrakis[3-(3,5-di-tert-butyl-4-hydroxyphenyl)propionate], octadecyl-3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylene bis(3,5-di-tert-butyl-4-hydroxy-hydrocinnamide), 3,5-di-tert-butyl-4-hydroxy-benzylphosphonate-diethyl ester, tris(3,5-di-tert-butyl-4-hydroxybenzyl) isocyanurate and 3,9-bis{1,1-dimethyl-2-[β-tert-butyl-4-hydroxy-5-methylphenyl)propionyloxy] ethyl}-2,4,8,10-tetraoxaspiro(5,5)undecane. The content of the antioxidant in the polycarbonate resin is preferably 0.001 to 0.3 parts by weight relative to 100 parts by weight of the polycarbonate resin.

Examples of the processing stabilizer include a phosphorus-based processing heat stabilizer and a sulfur-based processing heat stabilizer. Examples of the phosphorus-based processing heat stabilizer include phosphorous acid, phosphoric acid, phosphonous acid, phosphonic acid and esters thereof. Specific examples thereof include triphenyl phosphite, tris(nonylphenyl) phosphite, tris(2,4-di-tert-butylphenyl) phosphite, tris(2,6-di-tert-butylphenyl) phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, bis(2,6-di-tert-butyl-4-methylphenyl) pentaerythritol diphosphite, 2,2-methylenebis(4,6-di-tert-butylphenyl) octylphosphite, bis(nonylphenyl) pentaerythritol diphosphite, bis(2,4-dicumylphenyl) pentaerythritol diphosphite, bis(2,4-di-tert-butylphenyl) pentaerythritol diphosphite, distearylpentaerythritol diphosphite, tributyl phosphate, triethyl phosphate, trimethyl phosphate, triphenyl phosphate, diphenyl monoorthoxenyl phosphate, dibutyl phosphate, dioctyl phosphate, diisopropyl phosphate, dimethyl benzenephosphonate, diethyl benzenephosphonate, dipropyl benzenephosphonate, tetrakis(2,4-di-t-butylphenyl)-4,4'-biphenylene diphosphonate, tetrakis(2,4-di-t-butylphenyl)-4,3'-biphenylene diphosphonate, tetrakis(2,4-di-t-butylphenyl)-3,3'-biphenylene diphosphonate, bis(2,4-di-tert-butylphenyl)-4-phenyl-phenylphosphonate and bis(2,4-di-tert-butylphenyl)-3-phenyl-phenylphosphonate.

The content of the phosphorus-based processing heat stabilizer in the polycarbonate resin is preferably 0.001 to 0.2 parts by weight relative to 100 parts by weight of the polycarbonate resin.

Examples of the sulfur-based processing heat stabilizer include pentaerythritol-tetrakis(3-lauryl thiopropionate), pentaerythritol-tetrakis(3-myristyl thiopropionate), pentaerythritol-tetrakis(3-stearyl thiopropionate), dilauryl-3,3'-thiodipropionate, dimyristyl-3,3'-thiodipropionate and distearyl-3,3'-thiodipropionate. The content of the sulfur-based processing heat stabilizer in the polycarbonate resin is preferably 0.001 to 0.2 parts by weight relative to 100 parts by weight of the polycarbonate resin.

Regarding the mold release agent, it is preferred that 90 wt % or more of it is made of an ester of an alcohol and a fatty acid. Specific examples of the ester of an alcohol and a fatty acid include an ester of a monohydric alcohol and a fatty acid and a partial ester or whole ester of a polyhydric alcohol and a fatty acid. As the above-described ester of a monohydric alcohol and a fatty acid, an ester of a monohydric alcohol having 1 to 20 carbon atoms and a saturated fatty acid having 10 to 30 carbon atoms is preferred. Further, as the partial ester or whole ester of a polyhydric alcohol and a fatty acid, a partial ester or whole ester of a polyhydric alcohol having 1 to 25 carbon atoms and a saturated fatty acid having 10 to 30 carbon atoms is preferred.

Specific examples of the ester of a monohydric alcohol and a saturated fatty acid include stearyl stearate, palmityl palmitate, butyl stearate, methyl laurate and isopropyl palmitate. Specific examples of the partial ester or whole ester of a polyhydric alcohol and a saturated fatty acid include whole esters or partial esters of monoglyceride stearate, diglyceride stearate, triglyceride stearate, monosorbitate stearate, monoglyceride behenate, monoglyceride caprate, monoglyceride laurate, pentaerythritol monostearate, pentaerythritol tetrastearate, pentaerythritol tetrapelargonate, propylene glycol monostearate, biphenyl biphenate, sorbitan monostearate, 2-ethylhexyl stearate and dipentaerythritols such as dipentaerythritol hexastearate. Among them, monoglyceride stearate and monoglyceride laurate are particularly preferred. The content of these mold release agents is preferably 0.005 to 2.0 parts by weight, more preferably 0.01 to 0.6 parts by weight, and even more preferably 0.02 to 0.5 parts by weight relative to 100 parts by weight of the polycarbonate resin.

The ultraviolet absorber is preferably at least one ultraviolet absorber selected from the group consisting of a benzotriazole-based ultraviolet absorber, a benzophenone-based ultraviolet absorber, a triazine-based ultraviolet absorber, a cyclic iminoester-based ultraviolet absorber and a cyanoacrylate-based ultraviolet absorber. That is, ultraviolet absorbers mentioned below may be used solely, or two or more of them may be used in combination.

Examples of the benzotriazole-based ultraviolet absorber include 2-(2-hydroxy-5-methylphenyl)benzotriazole, 2-(2-hydroxy-5-tert-octylphenyl)benzotriazole, 2-(2-hydroxy-3, 5-dicumylphenyl)phenylbenzotriazole, 2-(2-hydroxy-3-tert-butyl-5-methylphenyl)-5-chlorobenzotriazole, 2,2'-methylenebis[4-(1,1,3,3-tetramethylbutyl)-6-(2N-benzotriazol-2-yl)phenol], 2-(2-hydroxy-3,5-di-tert-butylphenyl)benzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-octylphenyl)benzotriazole, 2-(2-hydroxy-5-tert-butylphenyl)benzotriazole, 2-(2-hydroxy-4-octoxyphenyl) benzotriazole, 2,2'-methylenebis(4-cumyl-6-benzotriazolephenyl), 2,2'-p-phenylenebis(1,3-benzoxazin-4-one) and 2-[2-hydroxy-3-(3,4,5,6-tetrahydrophthalimidomethyl)-5-methylphenyl] benzotriazole.

Examples of the benzophenone-based ultraviolet absorber include 2,4-dihydroxybenzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxybenzophenone, 2-hydroxy-4-methoxy-5-sulfoxytrihydrate benzophenone, 2,2'-dihydroxy-4-methoxybenzophenone, 2,2',4,4'-tetrahydroxybenzophenone, 2,2'-dihydroxy-4,4'-dimethoxybenzophenone, 2,2'-dihydroxy-4,4'-dimethoxy-5-sodiumsulfoxybenzophenone, bis(5-benzoyl-4-hydroxy-2-methoxyphenyl)methane, 2-hydroxy-4-n-dodecyloxybenzophonone and 2-hydroxy-4-methoxy-2'-carboxybenzophenone.

Examples of the triazine-based ultraviolet absorber include 2-(4,6-diphenyl-1,3,5-triazin-2-yl)-5-[(hexyl)oxy]-phenol, 2-(4,6-bis(2,4-dimethylphenyl)-1,3,5-triazin-2-yl)-5-[(octyl)oxy]-phenol and 2,4,6-tris(2-hydroxy-4-hexyloxy-3-methylphenyl)-1,3,5-triazine.

Examples of the cyclic iminoester-based ultraviolet absorber include 2,2'-bis(3,1-benzoxazin-4-one), 2,2'-p-phenylenebis(3,1-benzoxazin-4-one), 2,2'-m-phenylenebis(3,1-benzoxazin-4-one), 2,2'-(4,4'-diphenylene)bis(3,1-benzoxazin-4-one), 2,2'-(2,6-naphthalene)bis(3,1-benzoxazin-4-one), 2,2'-(1,5-naphthalene)bis(3,1-benzoxazin-4-one), 2,2'-(2-methyl-p-phenylene)bis(3,1-benzoxazin-4-one), 2,2'-(2-nitro-p-phenylene)bis(3,1-benzoxazin-4-one) and 2,2'-(2-chloro-p-phenylene)bis(3,1-benzoxazin-4-one).

Examples of the cyanoacrylate-based ultraviolet absorber include 1,3-bis-[(2'-cyano-3',3'-diphenylacryloyl)oxy]-2,2-bis[(2-cyano-3,3-diphenylacryloyl) oxy]methyl)propane and 1,3-bis-[(2-cyano-3,3-diphenylacryloyl)oxy]benzene.

The content of the ultraviolet absorber is preferably 0.01 to 3.0 parts by weight, more preferably 0.02 to 1.0 parts by weight, and even more preferably 0.05 to 0.8 parts by weight relative to 100 parts by weight of the polycarbonate resin. When the content is within these ranges, sufficient weatherability can be imparted to the polycarbonate resin according to intended use.

The polycarbonate resin of the embodiment exhibits a high refractive index and excellent heat resistance, and further has flowability appropriate for molding. Moreover, the polycarbonate resin exhibits low birefringence and optical distortion is not easily caused thereby, and therefore, other than as optical lenses, the polycarbonate resin can be advantageously used as a structural material of optical components such as a transparent conductive substrate to be used for a liquid crystal display, an organic EL display, a solar cell, etc., an optical disk, a liquid crystal panel, an optical card, a sheet, a film, an optical fiber, a connector, a vapor-deposited plastic reflection mirror and a display, or as an optical molded body appropriate for use as a functional material.

To the surface of the optical molded body, a coat layer such as an antireflection layer, a hard coat layer or the like may be provided according to need. The antireflection layer may be either a single layer or a multilayer, and may be made of either an organic substance or an inorganic substance, but is preferably made of an inorganic substance. Specific examples thereof include oxides and fluorides such as silicon oxide, aluminium oxide, zirconium oxide, titanium oxide, cerium oxide, magnesium oxide and magnesium fluoride.

(Optical Lens)

An optical lens produced by using the polycarbonate resin of the embodiment has a high refractive index and excellent heat resistance, and therefore can be used in the field in which expensive glass lenses having a high refractive index have been conventionally used including telescopes, binoculars and television projectors and is very useful. The optical lens is preferably used in the form of an aspherical lens according to need. In the case of the aspherical lens, since the spherical aberration can be adjusted to be substantially zero by one lens, it is not necessary to remove the spherical aberration by combining a plurality of spherical lenses, and reduction in weight and reduction in the production cost can be carried out. Accordingly, the aspherical lens is particularly useful as a camera lens among optical lenses.

The optical lens is molded by any method such as the injection molding method, the compression molding method and the injection compression molding method. By using the polycarbonate resin of the embodiment, an aspherical lens having a high refractive index and low birefringence, which is technically difficult to obtain by processing a glass lens, can be more conveniently obtained.

In order to avoid mixing of a foreign material in the optical lens as much as possible, the molding environment must be a low-dust environment, and it is preferably Class 6 or lower, and more preferably Class 5 or lower.

(Optical Film)

An optical film produced by using the polycarbonate resin of the embodiment has excellent transparency and heat resistance, and therefore is suitably used for a film for liquid crystal substrates, an optical memory card, etc.

In order to avoid mixing of a foreign material in the optical film as much as possible, the molding environment must be a low-dust environment, and it is preferably Class 6 or lower, and more preferably Class 5 or lower.

(4) Polycarbonate Resin Composition

The above-described polycarbonate resin may be in the form of a resin composition containing a plurality of resins. Specifically, the polycarbonate resin composition comprises: a polycarbonate resin (E) having a structural unit (A) derived from a compound represented by general formula (1); and a polycarbonate resin (F) having a structural unit (B) derived from a compound represented by general formula (2) (excluding dicarboxylic acid).

As described above, the polycarbonate resin composition comprises at least a polycarbonate resin (E) having a structural unit (A) derived from a compound represented by general formula (1) and a polycarbonate resin (F) having a structural unit (B) derived from a compound represented by general formula (2). The polycarbonate resin composition comprises a structural unit derived from preferably a compound represented by general formula (2a) or (2b), and more preferably a compound represented by general formula (2a), which are included in the compound represented by general formula (2).

The polycarbonate resin composition may contain another resin in addition to the polycarbonate resin (E) and the polycarbonate resin (F) within a range in which the features of the present invention are not impaired.

Examples of the above-described another resin which may be contained in the polycarbonate resin composition include: polyethylene, polypropylene, polyvinyl chloride, polystyrene, (meth)acrylic resin, ABS resin, polyamide, polyacetal, polycarbonate (other than the polycarbonate resin (E) and the polycarbonate resin (F)), polyphenylene ether, polyester, polyphenylene sulfide, polyimide, polyether sulfone, polyether ether ketone, fluororesin, cycloolefin polymer, ethylene-vinyl acetate copolymer, epoxy resin, silicone resin, phenol resin, unsaturated polyester resin and polyurethane.

The content of the above-described another resin which may be contained in the polycarbonate resin composition is preferably 20 parts by mass or less, and more preferably 10 parts by mass or less relative to the total mass of the polycarbonate resin (E) and the polycarbonate resin (F).

When the content of the above-described another resin is too much, compatibility is reduced, and transparency of the resin composition may be reduced.

In order to keep optical distortion at a low level, the polycarbonate resin (E) is preferably composed of the carbonate unit induced from the structural unit (A), and the polycarbonate resin (F) is preferably composed of the carbonate unit induced from the structural unit (B). Further, a resin composition composed of only the polycarbonate resin (E) and the polycarbonate resin (F) is particularly preferred.

In the polycarbonate resin composition, phenol produced at the time of the production of respective resins constituting the composition and carbonic acid diester which is unreacted and remains are present as impurities. The phenol content in the polycarbonate resin composition is preferably 0.1 to 3000 ppm, more preferably 0.1 to 2000 ppm, and particularly preferably 1 to 1000 ppm, 1 to 800 ppm, 1 to 500 ppm or 1 to 300 ppm. Further, the carbonic acid diester content in the polycarbonate resin composition is preferably 0.1 to 1000 ppm, more preferably 0.1 to 500 ppm, and particularly preferably 1 to 100 ppm. By adjusting the amounts of phenol and carbonic acid diester contained in the polycarbonate resin composition, a resin composition having physical properties appropriate for purposes can be obtained. The adjustment of the phenol content and the carbonic acid diester content can be suitably carried out by changing conditions for polycondensation and apparatuses. The adjustment can also be carried out by changing conditions for the extrusion process after polycondensation.

When the content of phenol or carbonic acid diester is more than the above-described ranges, it may cause problems such as reduction in the strength of a resin molded body obtained and generation of odor. Meanwhile, when the content of phenol or carbonic acid diester is less than the above-described ranges, it may cause reduction in the plasticity of a resin at the time of melting.

Hereinafter, the respective resins constituting the polycarbonate resin composition will be described.

<Polycarbonate Resin (E)>

The polycarbonate resin (E) comprises the structural unit derived from the compound represented by general formula (1).

As a repeating structural unit of the polycarbonate resin (E), a structural unit derived from a compound other than the compound represented by general formula (1) may be contained, but the amount thereof is desirably 20 mol % or less, and more desirably 10 mol % or less relative to 100 mol % of the structural unit (A). When the amount is within the above-described ranges, a high refractive index can be retained.

The polystyrene equivalent average molecular weight (Mw) of the polycarbonate resin (E) is preferably 20000 to 200000, more preferably 25000 to 120000, and particularly preferably 25000 to 50000.

When Mw is less than 20000, a resin becomes fragile and therefore it is undesirable. When Mw is more than 200000, the melt viscosity increases, resulting in difficulty in taking out a resin from a mold at the time of molding, and in addition, the flowability is reduced, resulting in difficulty in handling in a molten state, and therefore it is undesirable.

<Method for Producing the Polycarbonate Resin (E)>

The method for producing the polycarbonate resin (E) will be described.

The method for producing the polycarbonate resin (E) is not particularly limited. For example, it can be produced by the melt polycondensation method using a dihydroxy compound represented by general formula (1) in the presence of a carbonic acid diester and a catalyst. As the catalyst, a basic compound catalyst or a transesterification catalyst or a mixed catalyst made of both of them can be used.

The polycarbonate resin (E) may contain a structural unit derived from another dihydroxy compound other than the dihydroxy compound represented by general formula (1). Examples of the above-described another dihydroxy compound include: an aliphatic dihydroxy compound such as ethylene glycol, 1,3-propanediol, 1,2-propanediol, 1,4-butanediol, 1,3-butanediol, 1,2-butanediol, 1,5-heptanediol and 1,6-hexanediol; an alicyclic dihydroxy compound such as 1,2-cyclohexanedimethanol, 1,3-cyclohexanedimethanol, 1,4-cyclohexanedimethanol, tricyclodecanedimethanol, pentacyclopentadecanedimethanol, 2,6-decalindimethanol, 1,5-decalindimethanol, 2,3-decalindimethanol, 2,3-norbornanedimethanol, 2,5-norbornanedimethanol and 1,3-adamantanedimethanol; and an aromatic bisphenol such as 2,2-bis(4-hydroxyphenyl)propane [=bisphenol A], 2,2-bis(4-hydroxy-3,5-dimethylphenyl)propane, 2,2-bis(4-hydroxy-3,5-diethylphenyl)propane, 2,2-bis(4-hydroxy-(3,5-diphenyl)phenyl)propane, 2,2-bis(4-hydroxy-3,5- dibromophenyl)propane, 2,2-bis(4-hydroxyphenyl)pentane, 2,4'-dihydroxy-diphenylmethane, bis(4-hydroxyphenyl) methane, bis(4-hydroxy-5-nitrophenyl)methane, 1,1-bis(4-hydroxyphenyl)ethane, 3,3-bis(4-hydroxyphenyl)pentane, 1,1-bis(4-hydroxyphenyl)cyclohexane, bis(4-hydroxyphenyl)sulfone, 2,4'-dihydroxydiphenylsulfone, bis(4-hydroxyphenyl)sulfide, 4,4'-dihydroxydiphenylether, 4,4'-dihydroxy-3,3'-dichlorodiphenylether, 9,9-bis(4-hydroxyphenyl)fluorene and 9,9-bis(4-hydroxy-2-methylphenyl)fluorene.

In this regard, the above-described another dihydroxy compound is added in an amount of desirably 20 mol % or less, and more desirably 10 mol % or less relative to 100 mol % of the structural unit derived from the dihydroxy compound represented by general formula (1). When the amount is within the above-described ranges, a high refractive index can be retained.

Specific production methods, compounds to be used, etc., are the same as those described in "(2) Method for producing a polycarbonate resin comprising a structural unit derived from a compound represented by general formula (2a)" above, except that the compound represented by general formula (2a) is not used.

<Method for Producing the Polycarbonate Resin (F)>

The method for producing the polycarbonate resin (F) is the same as the above-described method for producing the polycarbonate resin (E), except that the compound represented by general formula (1) is changed to the compound represented by general formula (2).

(5) Method for Producing the Polycarbonate Resin Composition

The method for producing the polycarbonate resin composition is not particularly limited. For example, it can be produced by any of the following methods:

[1] a method in which the polycarbonate resin (E) in a solid state is mixed with the polycarbonate resin (F) in a solid state and the mixture is kneaded by a kneading machine;
[2] a method in which the polycarbonate resin (F) in a solid state is added to the polycarbonate resin (E) in a molten state and the mixture is kneaded;
[3] a method in which the polycarbonate resin (E) in a solid state is added to the polycarbonate resin (F) in a molten state and the mixture is kneaded; and
[4] a method in which the polycarbonate resin (E) in a molten state is mixed with the polycarbonate resin (F) in a molten state and the mixture is kneaded.

Regarding kneading, either a continuous type method or a batch type method may be employed. As the kneading machine, an extruder is suitably used in the case of the continuous type method, and Labo Plastomill or a kneader is suitably used in the case of the batch type method.

The polycarbonate resin (E) and the polycarbonate resin (F) are blended together with a weight ratio ((100×(E))/((E)+(F))) of preferably 1 to 99%, more preferably 10 to 90%, even more preferably 25 to 60%, and particularly preferably 40 to 70%.

Note that the polycarbonate resin composition may contain two or more types of each of the polycarbonate resin (E) and the polycarbonate resin (F). In this case, (E) and (F) in the formula (100×(E))/((E)+(F)) respectively mean the total weight of the two or more types of the polycarbonate resin (E) and the total weight of the two or more types of the polycarbonate resin (F).

The difference of the polystyrene equivalent weight-average molecular weight (ΔMw) between the polycarbonate resin (E) and the polycarbonate resin (F) is preferably 0 to 120,000, more preferably 0 to 80,000, and particularly preferably 0 to 20,000. When the difference is within the above-described ranges, the viscosity difference between the polycarbonate resin (E) and the polycarbonate resin (F) is not too large, good compatibility is provided and a blended resin composition has high transparency, and therefore it is preferred.

Moreover, to the polycarbonate resin composition, an antioxidant, a mold release agent, an ultraviolet absorber, a flowability improving agent, a toughening agent, a crystal nucleating agent, a dye, an antistatic agent, an antimicrobial agent or the like may be added according to need. These additives may be added in advance to each or either of the polycarbonate resin (E) and the polycarbonate resin (F) before performing kneading, and may be added and kneaded simultaneously at the time of kneading or may be kneaded after mixing.

Further, the polycarbonate resin composition may contain a polycarbonate resin other than the polycarbonate resin (E) and the polycarbonate resin (F), but more preferably, does not substantially contain such a polycarbonate resin.

As the antioxidant, processing stabilizer, mold release agent and ultraviolet absorber contained in the resin composition, the same things as those described in "(3) Optical molded body obtained by using polycarbonate resin" above can be used, and the same adding amounts can also be employed.

(6) Optical Molded Body Obtained by Using Polycarbonate Resin Composition

Using the above-described polycarbonate resin composition, an optical molded body such as an optical lens and an optical film can be produced according to methods similar to those described in "(3) Optical molded body obtained by using polycarbonate resin" above. The polycarbonate resin composition of the embodiment is excellent in moldability and heat resistance, and therefore can be advantageously used particularly for optical lenses which require injection molding.

Preferred physical properties of the polycarbonate resin composition and the molded body are as described below.

The molecular weight (polystyrene equivalent weight-average molecular weight (Mw)) of the polycarbonate resin composition of the embodiment (after mixing) is preferably 20000 to 200000, more preferably 25000 to 120000, and particularly preferably 25000 to 50000.

The glass transition temperature of the polycarbonate resin composition of the embodiment is preferably 95° C. to 180° C., and more preferably 115° C. to 160° C.

The refractive index of the molded body produced from the polycarbonate resin composition of the embodiment (23° C., wavelength: 589 nm) is preferably 1.640 to 1.680, and more preferably 1.650 to 1.670.

The Abbe number of the molded body produced from the polycarbonate resin composition of the embodiment is preferably 24 or less, and more preferably 23 or less.

Regarding optical distortion of the polycarbonate resin composition of the embodiment, when a molded piece of the polycarbonate resin composition is sandwiched between two polarizing plates and light leakage from behind is visually observed according to the crossed-Nicol method, it is preferred that light leakage is not significant, but is slight.

Since the molded body produced from the polycarbonate resin composition of the embodiment exhibits low birefringence, it is suitable for a structural material of optical components such as a lens, an optical film and an optical sheet. It is particularly suitable for optical components such as a lens because it has high transparency as well as low birefringence.

To the surface of the optical molded body, a coat layer such as an antireflection layer, a hard coat layer or the like may be provided according to need. The antireflection layer may be either a single layer or a multilayer, and may be made of either an organic substance or an inorganic substance, but is preferably made of an inorganic substance. Specific examples thereof include oxides and fluorides such as silicon oxide, aluminium oxide, zirconium oxide, titanium oxide, cerium oxide, magnesium oxide and magnesium fluoride.

2. Polyester Resin

The polyester resin of the embodiment has a structural unit derived from a dihydroxy compound represented by general formula (1) (hereinafter sometimes referred to as "structural unit (G)") and a structural unit derived from a dihydroxy compound represented by general formula (2) (hereinafter sometimes referred to as "structural unit (H)"). In the polyester resin, the structural units are bound to each other via an ester bond. The ester bond is also referred to as "structural unit derived from a dicarboxylic acid or a derivative thereof" or "dicarboxylic acid structural unit".

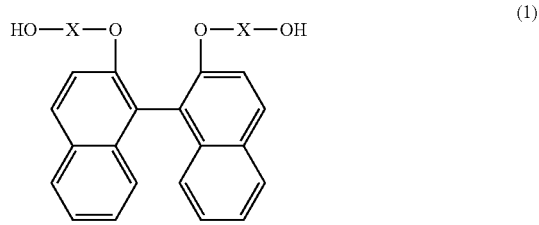

(1)

[In formula (1), X represents a $C_{1-10}$ alkylene group.]

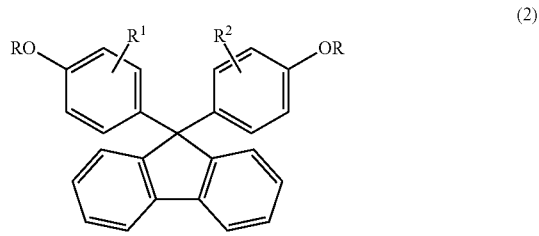

(2)

[In formula (2):

$R^1$ and $R^2$ each independently represent a hydrogen atom, a $C_{1-20}$ alkyl group, a $C_{1-20}$ alkoxyl group, a $C_{5-20}$ cycloalkyl group, a $C_{5-20}$ cycloalkoxyl group, a $C_{6-20}$ aryl group or a $C_{6-20}$ aryloxy group; and R represents a hydrogen atom or a $C_{1-20}$ hydroxyalkyl group.]

As the compound represented by general formula (2) (excluding carboxylic acid), a compound represented by general formula (2a) and a compound represented by general formula (2b) can be suitably used.

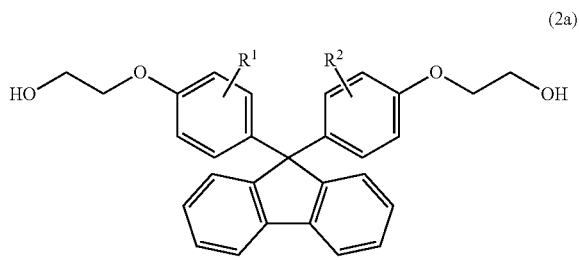

(2a)

(In formula (2a), $R^1$ and $R^2$ are as defined with respect to formula (2) above.)

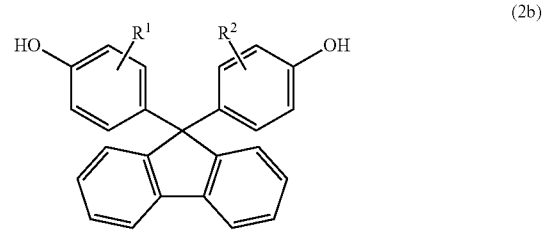

(2b)

(In formula (2b), $R^1$ and $R^2$ are as defined with respect to formula (2) above.)

Note that details of the compound represented by general formula (2a) or (2b) are as described above.

Hereinafter, the structural unit derived from the compound represented by general formula (2a) is sometimes referred to as "structural unit (I)".

The ratio of the total of the dihydroxy structural unit and the dicarboxylic acid structural unit in all the structural units of the polyester resin is preferably 80 mol % or more, more preferably 90 mol % or more, and particularly preferably 100 mol %.

The polyester resin of the embodiment may contain a structural unit derived from a dihydroxy compound other than the structural units (G) to (I), and examples of the dihydroxy compound (excluding dicarboxylic acid and derivatives thereof) include alkylene glycols (e.g., linear or branched $C_{2-12}$ alkylene glycols such as ethylene glycol, propylene glycol, trimethylene glycol, 1,3-butanediol, tetramethylene glycol (1,4-butanediol), hexanediol, neopentylglycol, octanediol and decanediol), and (poly)oxyalkylene glycols (e.g., diethylene glycol, triethylene glycol, dipropylene glycol).

Regarding structural units derived from these dihydroxy compounds, one type may be contained solely, or two or more types may be contained in combination.

Moreover, in terms of physical properties, the ratio of the structural unit derived from ethylene glycol in all the dihydroxy structural units (excluding the structural unit derived from dicarboxylic acid) is preferably 5 to 70 mol %, and more preferably 5 to 40 mol %.

The ratio of the structural unit (G) in all the dihydroxy structural units (excluding the structural unit derived from dicarboxylic acid) is preferably 5 to 95 mol %, and more preferably 60 to 95%.

The content of the structural unit (H) is preferably 95 to 5 mol %, and more preferably 40 to 5 mol % relative to all the dihydroxy structural units (excluding the structural unit derived from dicarboxylic acid). The same applies to the case where the structural unit (H) is the structural unit (I).

The molar ratio between the structural unit (G) and the structural unit (H) (G/H) is preferably 40/60 to 99/1, more preferably 60/40 to 95/5, and particularly preferably 70/30 to 90/10. The same applies to the case where the structural unit (H) is the structural unit (I).

The dicarboxylic acid structural unit contained in the polyester resin of the embodiment is not particularly limited, but preferred are structural units derived from: aromatic dicarboxylic acids such as naphthalene dicarboxylic acid, terephthalic acid, isophthalic acid, phthalic acid, 2-methylterephthalic acid, biphenyl dicarboxylic acid and tetralin dicarboxylic acid; aliphatic dicarboxylic acids such as oxalic acid, malonic acid, succinic acid, maleic acid, fumaric acid, glutaric acid, adipic acid, pimelic acid, suberic acid, azelaic acid, sebacic acid, decanedicarboxylic acid, dodecanedicarboxylic acid, cyclohexanedicarboxylic acid, decalin dicarboxylic acid, norbornane dicarboxylic acid, tricyclodecanedicarboxylic acid, pentacyclododecanedicarboxylic acid, 3,9-bis(1,1-dimethyl-2-carboxyethyl)-2,4,8,10-tetraoxaspiro[5.5]undecane, 5-carboxy-5-ethyl-2-(1,1-dimethyl-2-carboxyethyl)-1,3-dioxane and dimer acid; and derivatives thereof. Examples of derivatives of these dicarboxylic acids include esters, acid anhydrides and acid halides. In addition, structural units derived from a dicarboxylic acid represented by general formula (3) and a derivative thereof are also preferred.

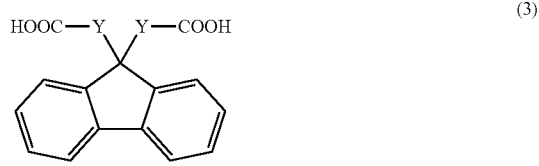

(3)

(In the formula, Ys each independently represent a single bond, a $C_{1-20}$ alkyl group, a $C_{1-20}$ alkoxyl group, a $C_{5-20}$ cycloalkyl group, a $C_{5-20}$ cycloalkoxyl group, a $C_{6-20}$ aryl group or a $C_{6-20}$ aryloxy group.)

The dicarboxylic acid structural unit constituting the polyester resin of the embodiment may be composed of one of the structural units mentioned above, or two or more of the structural units.

The polyester resin may have a structure of either a random copolymer, block copolymer or alternating copolymer.

<Method for Producing the Polyester Resin>

The above-described polyester resin can be produced by reacting a compound by which the dicarboxylic acid structural unit is produced (e.g., dicarboxylic acids, and esters, acid anhydrides and acid halides thereof) with a compound by which the dihydroxy structural unit is produced (e.g., dihydroxy compounds, excluding structural units derived from dicarboxylic acids). Specifically, the compound represented by general formula (1), the compound represented by general formula (2) (preferably the compound represented by general formula (2a) or (2b)), and a dicarboxylic acid or a derivative thereof are reacted. Examples of the reaction method include various methods such as the melt polymerization method including the transesterification method and the direct polymerization method, the solution polymerization method and the interfacial polymerization method. Among them, the melt polymerization method not using a reaction solvent is preferred.

The dicarboxylic acid or a derivative thereof is preferably used at a ratio of 0.90 to 1.01 mol relative to 1 mol of the total of the dihydroxy compounds.

The transesterification method that is one of melt polymerization methods is a method of obtaining a polyester by reacting a dicarboxylic acid ester with the dihydroxy compound (excluding the dicarboxylic acid) in the presence of a catalyst and performing transesterification while distilling away an alcohol produced, and it is generally used for synthesis of a polyester resin.

The direct polymerization method is a method of obtaining a polyester resin by performing a dehydration reaction of the dicarboxylic acid and the dihydroxy compound (excluding the dicarboxylic acid) to form an ester compound and then performing a transesterification reaction while distilling away an excess of the dihydroxy compound under reduced pressure. The direct polymerization method has the advantages that distillation of an alcohol is not performed unlike the transesterification method and that an inexpensive dicarboxylic acid can be used as a raw material. Regarding the type of the polymerization catalyst, the amount of the catalyst, polymerization conditions such as temperature, and additives such as a heat stabilizer, an etherification prevention agent and a catalyst deactivator for performing these melt polymerization methods, publicly-known methods can be referred to.

The reaction may be performed in the presence of a catalyst. As the catalyst, various catalysts to be utilized for the production of polyester resins, for example, a metal catalyst can be used. As the metal catalyst, for example, a metal compound including an alkali metal, an alkaline earth metal, a transition metal, a metal belonging to Group 13 of the periodic table, a metal belonging to Group 14 of the periodic table, a metal belonging to Group 15 of the periodic table or the like is used. Examples of the metal compound include alkoxides, organic acid salts (acetates, propionates, etc.), inorganic acid salts (borates, carbonates, etc.) and metal oxides. These catalysts may be used solely, or two or more of them may be used in combination. The amount of the catalyst to be used may be, for example, about $0.01\times10^{-4}$ to $100\times10^{-4}$ mol, and preferably about $0.1\times10^{-4}$ to $40\times10^{-4}$ mol relative to 1 mol of the dicarboxylic acid.

Specific examples of the alkali metal compound include sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, stearium, potassium benzoate, cesium benzoate, lithium benzoate, disodium hydrogen phosphate, dipotassium hydrogen phosphate, dilithium hydrogen phosphate, disodium phenyl phosphate, a disodium salt, dipotassium salt, dicesium salt or dilithium salt of bisphenol A, and a sodium salt, potassium salt, cesium salt or lithium salt of phenol.

Specific examples of the alkaline earth metal compound include magnesium hydroxide, calcium hydroxide, strontium hydroxide, barium hydroxide, magnesium hydrogen carbonate, calcium hydrogen carbonate, strontium hydrogen carbonate, barium hydrogen carbonate, magnesium carbonate, calcium carbonate, strontium carbonate, barium carbonate, magnesium acetate, calcium acetate, strontium acetate, barium acetate, magnesium stearate, calcium stearate, calcium benzoate and magnesium phenyl phosphate.

As the transesterification catalyst, salts of zinc, tin, zirconium and lead are preferably used. These substances may be used solely, or two or more of them may be used in combination.

These catalysts are used at a ratio of generally about $1\times10^{-9}$ to $1\times10^{-3}$ mol, and preferably about $1\times10^{-7}$ to $1\times10^{-4}$ mol relative to 1 mol of the total of the dihydroxy compounds (excluding the dicarboxylic acid).

To the polyester resin, other resins, various additives such as an antioxidant, a mold release agent, a light stabilizer, an ultraviolet absorber, a plasticizer, an extender, a matting agent, a drying regulator, an antistatic agent, an anti-settling agent, a surfactant, a flowability improving agent, a drying oil, a wax, a filler, a coloring agent, a reinforcing agent, a surface smoothing agent, a leveling agent, a curing reaction accelerator and a thickener, and a molding aid can be added. Specific examples, adding amounts, etc. of these additives are as described in "1. Polycarbonate resin" above. As the flowability improving agent or the mold release agent, an ester of a multifunctional alcohol and a fatty acid, particularly a stearic acid ester of glycerin is preferably added in an amount of 0.005 to 2.0 parts by weight, preferably 0.01 to 0.6 parts by weight, and more preferably 0.02 to 0.5 parts by weight relative to 100 parts by weight of the polyester resin, thereby reducing troubles due to mold release failure.

Further, in order not to impair thermal stability and hydrolytic stability of the obtained polyester resin, it is preferred to remove or deactivate the catalyst after the polymerization reaction is completed. In general, the catalyst can be deactivated by means of addition of a publicly-known acidic substance. As the acidic substance to be used for deactivation of the catalyst, specifically, aromatic sulfonic acids such as p-toluenesulfonic acid; aromatic sulfonic acid esters such as butyl p-toluenesulfonate and hexyl p-toluenesulfonate; aromatic sulfonates such as dodecylbenzenesulfonic acid tetrabutylphosphonium salt; organic halides such as stearic acid chloride, benzoyl chloride and p-toluenesulfonic acid chloride; alkyl sulfates such as dimethyl sulfate; organic halides such as benzyl chloride; etc. are preferably used.

It is desired that the content of foreign materials in the polyester resin of the embodiment is as small as possible, and filtration of a melting raw material, filtration of a catalyst solution and filtration of a melting oligomer are preferably carried out. The mesh of the filter is preferably 7 μm or less, and more preferably 5 μm or less. Moreover, filtration of the produced resin using a polymer filter is preferably carried out. The mesh of the polymer filter is preferably 100 μm or less, and more preferably 30 μm or less. Further, the process of obtaining a resin pellet should definitely be carried out in a low-dust environment, which is preferably Class 6 or lower, and more preferably Class 5 or lower.

<Physical Properties of the Polyester Resin>

The refractive index and the Abbe number can be measured according to the below-described methods.

The polyester resin is dissolved in methylene chloride to produce a cast film, and the refractive index is measured by a refractometer. The value of the refractive index is measured at 25° C. and at 589 nm (d line), and the value of the Abbe number is calculated from refractive indexes measured at 656 nm (C line), 486 nm (F line) and d line.

In the polyester resin of the embodiment, the refractive index measured in this way is preferably 1.60 or more, and more preferably 1.645 to 1.70. Further, the Abbe number is preferably 21 or less, more preferably 20 or less, and for example, 17 to 21.

The glass transition temperature is measured by a differential scanning calorimeter and is not particularly limited, but is usually 110° C. or higher, preferably 115° C. or higher, and more preferably 120° C. or higher. When the glass transition temperature of the polyester resin is within the above-described ranges, an optical lens produced by using the resin is sufficiently resistant to the surface treatment including hard coating. Note that glass transition temperatures of the polyester resin and the polyester carbonate resin can be easily set to be 110° C. or higher by suitably selecting a conventionally-known diol or dicarboxylic acid (e.g., a diol having a cyclic acetal skeleton or aromatic hydrocarbon group, a dicarboxylic acid having a naphthalene skeleton). Meanwhile, when the glass transition temperature is too high, the temperature at the time of molding the resin must be high, and the resin itself may be thermally decomposed unpredictably. Therefore, the glass transition temperature is preferably lower than 150° C.

<Molded Body of the Polyester Resin>

The above-described polyester resin can be used for various applications. For example, it can be used for an injection molded body, a sheet, a film, an extrusion molded body such as a pipe, a bottle, a foam, an adhesive material, an adhesive and a paint. More specifically, the sheet may be either a single layer or a multilayer, and the film may also be either a single layer or a multilayer and may be unstretched or stretched in one direction or two directions, and may be laminated on a steel plate or the like. The bottle may be either a direct blow bottle or an injection blow bottle, and may be obtained by injection molding. The foam may be either a bead foam or an extruded foam. The polyester resin can be particularly preferably used for applications requiring high heat resistance and water vapor barrier properties, for example, products used in automobiles, packaging materials for import and export, electronic materials such as back sheets of solar cells, and food packaging materials for retorting or heating with a microwave oven.

In particular, by injection-molding the polyester resin of the embodiment into a lens shape using an injection molding machine or injection compression molding machine, an excellent optical lens can be obtained. At the time of obtaining an optical lens, in order to avoid mixing of a foreign material therein as much as possible, the molding environment must be a low-dust environment, and it is preferably Class 6 or lower, and more preferably Class 5 or lower.

The optical lens obtained by molding the polyester resin is preferably used in the form of an aspherical lens according to need. In the case of the aspherical lens, since the spherical aberration can be adjusted to be substantially zero by one lens, it is not necessary to remove the spherical aberration by combining a plurality of spherical lenses, and reduction in weight and reduction in the production cost can be carried out. Accordingly, the aspherical lens is particularly useful as a camera lens among optical lenses. The astigmatism of the aspherical lens is preferably 0 to 15 mλ, and more preferably 0 to 10 mλ.

To the surface of the optical lens obtained by molding the polyester resin, a coat layer such as an antireflection layer, a hard coat layer or the like may be provided according to need. The antireflection layer may be either a single layer or a multilayer, and may be made of either an organic substance or an inorganic substance, but is preferably made of an inorganic substance. Specific examples thereof include oxides and fluorides such as silicon oxide, aluminium oxide, zirconium oxide, titanium oxide, cerium oxide, magnesium oxide and magnesium fluoride.

The optical lens obtained by molding the polyester resin can be used as various lenses such as a pickup lens, an f-θ lens and a spectacle lens, but because of its high refractive index and low Abbe number, it can be particularly preferably used as a lens for correction of chromatic aberration. Specifically, the optical lens is preferably used as a lens of a single-lens reflex camera, a digital still camera, a video camera, a cellular phone with a camera, a disposable camera, a telescope, binoculars, a microscope, a projector or the like. When the optical lens obtained by using the polyester resin of the embodiment is a concave lens, it can be combined with another convex lens having a high Abbe number to be used as an optical lens system having a small chromatic aberration. The Abbe number of the convex lens to be combined is preferably 40 to 60, and more preferably 50 to 60.

3. Polyester Carbonate Resin

The polyester carbonate resin of the embodiment has a structural unit (L) derived from a dihydroxy compound represented by general formula (1) and a structural unit (M) derived from a dihydroxy compound represented by general formula (2). In the polyester carbonate resin, the structural units are bound to each other via a carbonate bond and an ester bond. The carbonate bond is also referred to as "structural unit derived from a carbonic acid diester", and the ester bond is also referred to as "structural unit derived from a dicarboxylic acid or a derivative thereof" or "dicarboxylic acid structural unit".

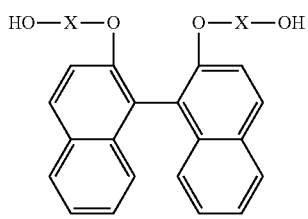
(1)

[In formula (1), X represents a $C_{1-10}$ alkylene group.]

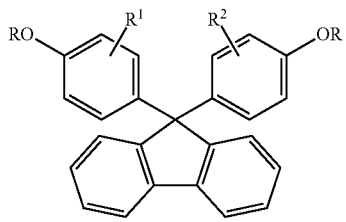
(2)

[In formula (2):

$R^1$ and $R^2$ each independently represent a hydrogen atom, a $C_{1-20}$ alkyl group, a $C_{1-20}$ alkoxyl group, a $C_{5-20}$ cycloalkyl group, a $C_{5-20}$ cycloalkoxyl group, a $C_{6-20}$ aryl group or a $C_{6-20}$ aryloxy group; and R represents a hydrogen atom or a $C_{1-20}$ hydroxyalkyl group.]

As the compound represented by general formula (2) (excluding carboxylic acid), a compound represented by general formula (2a) and a compound represented by general formula (2b) can be suitably used.

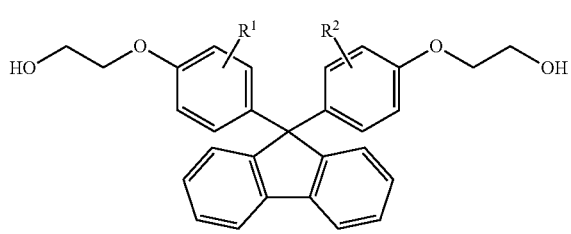
(2a)

(In formula (2a), $R^1$ and $R^2$ are as defined with respect to formula (2) above.)

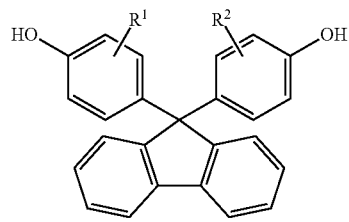
(2b)

(In formula (2b), $R^1$ and $R^2$ are as defined with respect to formula (2) above.)

Note that details of the compound represented by general formula (2a) or (2b) are as described above.

Hereinafter, the structural unit derived from the compound represented by general formula (2a) is sometimes referred to as "structural unit (N)".

The ratio of the total of the dihydroxy structural unit (excluding the structural unit derived from dicarboxylic acid), the carbonic acid diester structural unit and the dicarboxylic acid structural unit in all the structural units of the polyester carbonate resin is preferably 80 mol % or more, more preferably 90 mol % or more, and particularly preferably 100 mol %.

The ratio of the structural unit (L) in all the dihydroxy structural units (excluding the dicarboxylic acid structural unit) is preferably 5 to 95 mol %.

The content of the structural unit (M) is preferably 2.5 to 47.5 mol %, and more preferably 5 to 45 mol % relative to all the dihydroxy structural units (including the dicarboxylic acid structural unit). The same applies to the case where the structural unit (M) is the structural unit (N).

The molar ratio between the structural unit (L) and the structural unit (M) (L/M) is preferably 1/99 to 99/1, more preferably 20/80 to 95/5, and particularly preferably 40/60 to 90/10. The same applies to the case where the structural unit (M) is the structural unit (N).

The polyester carbonate resin may have a structure of either a random copolymer, block copolymer or alternating copolymer.

<Structural Units Derived from Dihydroxy Compounds>

The polyester carbonate resin of the embodiment may contain a structural unit derived from a dihydroxy compound other than the structural units (L) to (N), and examples of the dihydroxy compound (excluding dicarboxylic acid and derivatives thereof) include alkylene glycols (e.g., linear or branched $C_{2-12}$ alkylene glycols such as ethylene glycol, propylene glycol, trimethylene glycol, 1,3-butanediol, tetramethylene glycol (1,4-butanediol), hexanediol, neopentylglycol, octanediol and decanediol), and (poly)oxyalkylene glycols (e.g., diethylene glycol, triethylene glycol, dipropylene glycol).

Regarding structural units derived from these dihydroxy compounds, one type may be contained solely, or two or more types may be contained in combination.

<Structural Units Derived from Carbonic Acid Diesters>

Examples of the carbonic acid diester which is a precursor of a carbonate bond include diphenyl carbonate, ditolyl carbonate, bis(chlorophenyl) carbonate, m-cresyl carbonate, dimethyl carbonate, diethyl carbonate, dibutyl carbonate and dicyclohexyl carbonate. Among them, diphenyl carbonate is particularly preferred. Diphenyl carbonate is used at a ratio of preferably 0.97 to 1.10 mol, and more preferably 0.98 to 1.05 mol relative to 1 mol of the total of the dihydroxy compounds.

<Structural Units Derived from Dicarboxylic Acids>

The structural unit derived from the dicarboxylic acid contained in the polyester carbonate resin of the embodiment is not particularly limited, but preferred are structural units derived from: aromatic dicarboxylic acids such as naphthalene dicarboxylic acid, terephthalic acid, isophthalic acid, phthalic acid, 2-methylterephthalic acid, biphenyl dicarboxylic acid and tetralin dicarboxylic acid; aliphatic dicarboxylic acids such as oxalic acid, malonic acid, succinic acid, maleic acid, fumaric acid, glutaric acid, adipic acid, pimelic acid, suberic acid, azelaic acid, sebacic acid, decanedicarboxylic acid, dodecanedicarboxylic acid, cyclohexanedicarboxylic acid, decalin dicarboxylic acid, norbornane dicarboxylic acid, tricyclodecanedicarboxylic acid, pentacyclododecanedicarboxylic acid, 3,9-bis(1,1-dimethyl-2-carboxyethyl)-2,4,8,10-tetraoxaspiro[5.5]undecane, 5-carboxy-5-ethyl-2-(1,1-dimethyl-2-carboxyethyl)-1,3-dioxane and dimer acid; and derivatives thereof. Examples of derivatives of these dicarboxylic acids include esters, acid anhydrides and acid halides. In addition, structural units derived from a dicarboxylic acid represented by general formula (3) and a derivative thereof are also preferred.

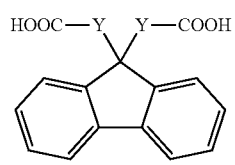

(3)

(In the formula, Ys each independently represent a single bond, a $C_{1-20}$ alkyl group, a $C_{1-20}$ alkoxyl group, a $C_{5-20}$ cycloalkyl group, a $C_{5-20}$ cycloalkoxyl group, a $C_{6-20}$ aryl group or a $C_{6-20}$ aryloxy group.)

The dicarboxylic acid structural unit may be composed of one of the structural units mentioned above, or two or more of the structural units.

<Method for Producing the Polyester Carbonate Resin>

The above-described polyester carbonate resin can be produced by performing a transesterification reaction of a compound by which the carbonic acid diester structural unit is produced, a compound by which the dicarboxylic acid structural unit is produced and a compound by which the dihydroxy structural unit is produced in a molten state in the presence of the catalyst. Specifically, the compound represented by general formula (1), the compound represented by general formula (2) (preferably the compound represented by general formula (2a) or (2b)), a dicarboxylic acid or a derivative thereof, and a carbonic acid diester are reacted. Examples of the reaction method include various methods such as the melt polymerization method including the transesterification method and the direct polymerization method, the solution polymerization method and the interfacial polymerization method. Among them, the melt polymerization method not using a reaction solvent is preferred.

The carbonic acid diester is used at a ratio of preferably 0.97 to 1.10 mol, and more preferably 0.98 to 1.05 mol relative to 1 mol of the total of the dihydroxy compounds. Further, the dicarboxylic acid or a derivative thereof is used at a ratio of preferably 0.01 to 0.20 mol, and more preferably 0.05 to 0.15 mol relative to 1 mol of the total of the dihydroxy compounds (excluding the dicarboxylic acid).

The transesterification method that is one of melt polymerization methods is a method of obtaining a polyester by reacting a dicarboxylic acid ester with the dihydroxy compound (excluding the dicarboxylic acid) in the presence of a catalyst and performing transesterification while distilling away an alcohol produced, and it is generally used for synthesis of a polyester resin.

The direct polymerization method is a method of obtaining a polyester resin by performing a dehydration reaction of the dicarboxylic acid and the dihydroxy compound (excluding the dicarboxylic acid) to form an ester compound and then performing a transesterification reaction while distilling away an excess of the dihydroxy compound under reduced pressure. The direct polymerization method has the advantages that distillation of an alcohol is not performed unlike the transesterification method and that an inexpensive dicarboxylic acid can be used as a raw material. Regarding the type of the polymerization catalyst, the amount of the catalyst, polymerization conditions such as temperature, and additives such as a heat stabilizer, an etherification prevention agent and a catalyst deactivator for performing these melt polymerization methods, publicly-known methods can be referred to.

The reaction may be performed in the presence of a catalyst. As the catalyst, various catalysts to be utilized for the production of polyester carbonate resins, for example, a metal catalyst can be used. As the metal catalyst, for example, a metal compound including an alkali metal, an alkaline earth metal, a transition metal, a metal belonging to Group 13 of the periodic table, a metal belonging to Group 14 of the periodic table, a metal belonging to Group 15 of the periodic table or the like is used. Examples of the metal compound include alkoxides, organic acid salts (acetates, propionates, etc.), inorganic acid salts (borates, carbonates, etc.) and metal oxides. These catalysts may be used solely, or two or more of them may be used in combination. The amount of the catalyst to be used may be, for example, about $0.01 \times 10^{-4}$ to $100 \times 10^{-4}$ mol, and preferably about $0.1 \times 10^{-4}$ to $40 \times 10^{-4}$ mol relative to 1 mol of the dicarboxylic acid component.

Specific examples of the alkali metal compound include sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, stearium, potassium benzoate, cesium benzoate, lithium benzoate, disodium hydrogen phosphate, dipotassium hydrogen phosphate, dilithium hydrogen phosphate, disodium phenyl phosphate, a disodium salt, dipotassium salt, dicesium salt or dilithium salt of bisphenol A, and a sodium salt, potassium salt, cesium salt or lithium salt of phenol.

Specific examples of the alkaline earth metal compound include magnesium hydroxide, calcium hydroxide, strontium hydroxide, barium hydroxide, magnesium hydrogen carbonate, calcium hydrogen carbonate, strontium hydrogen carbonate, barium hydrogen carbonate, magnesium carbonate, calcium carbonate, strontium carbonate, barium carbonate, magnesium acetate, calcium acetate, strontium acetate, barium acetate, magnesium stearate, calcium stearate, calcium benzoate and magnesium phenyl phosphate.

As the transesterification catalyst, salts of zinc, tin, zirconium and lead are preferably used. These substances may be used solely, or two or more of them may be used in combination.

These catalysts are used at a ratio of generally $1 \times 10^{-9}$ to $1 \times 10^{-3}$ mol, and preferably $10^{-7}$ to $10^{-4}$ mol relative to 1 mol of the total of the dihydroxy compounds (excluding the dicarboxylic acid).

To the polyester carbonate resin, other resins, various additives such as an antioxidant, a mold release agent, a light stabilizer, an ultraviolet absorber, a plasticizer, an extender, a matting agent, a drying regulator, an antistatic agent, an anti-settling agent, a surfactant, a flowability improving agent, a drying oil, a wax, a filler, a coloring agent, a reinforcing agent, a surface smoothing agent, a leveling agent, a curing reaction accelerator and a thickener, and a molding aid can be added. Specific examples, adding amounts, etc. of these additives are as described in "1. Polycarbonate resin" above. As the flowability improving agent or the mold release agent, an ester of a multifunctional alcohol and a fatty acid, particularly a stearic acid ester of glycerin is preferably added in an amount of 0.005 to 2.0 parts by weight, preferably 0.01 to 0.6 parts by weight, and more preferably 0.02 to 0.5 parts by weight relative to 100 parts by weight of the polyester carbonate resin, thereby reducing troubles due to mold release failure.

Further, in order not to impair thermal stability and hydrolytic stability of the obtained polyester carbonate resin, it is preferred to remove or deactivate the catalyst after the polymerization reaction is completed. In general, the catalyst can be deactivated by means of addition of a publicly-known acidic substance. As the acidic substance to be used for deactivation of the catalyst, specifically, aromatic sulfonic acids such as p-toluenesulfonic acid; aromatic sulfonic acid esters such as butyl p-toluenesulfonate and hexyl p-toluenesulfonate; aromatic sulfonates such as dodecylbenzenesulfonic acid tetrabutylphosphonium salt; organic halides such as stearic acid chloride, benzoyl chloride and p-toluenesulfonic acid chloride; alkyl sulfates such as dimethyl sulfate; organic halides such as benzyl chloride; etc. are preferably used.

It is desired that the content of foreign materials in the polyester carbonate resin of the embodiment is as small as possible, and filtration of a melting raw material, filtration of a catalyst solution and filtration of a melting oligomer are preferably carried out. The mesh of the filter is preferably 7 μm or less, and more preferably 5 μm or less. Moreover, filtration of the produced resin using a polymer filter is preferably carried out. The mesh of the polymer filter is preferably 100 μm or less, and more preferably 30 μm or less. Further, the process of obtaining a resin pellet should definitely be carried out in a low-dust environment, which is preferably Class 6 or lower, and more preferably Class 5 or lower.

<Physical Properties of the Polyester Carbonate Resin>

The refractive index and the Abbe number can be measured according to the below-described measurement methods.

The polyester carbonate resin is dissolved in methylene chloride to produce a cast film, and the refractive index is measured by a refractometer. The value of the refractive index is measured at 25° C. and at 589 nm (d line), and the value of the Abbe number is calculated from refractive indexes measured at 656 nm (C line), 486 nm (F line) and d line.

In the polyester carbonate resin of the embodiment, the refractive index measured in this way is preferably 1.60 or more, and more preferably 1.645 to 1.665. Further, the Abbe number is preferably 24 or less, more preferably 21 or less, and for example, 18 to 24.

The glass transition temperature is measured by a differential scanning calorimeter and is not particularly limited, but is usually 110° C. or higher, preferably 115° C. or higher, and more preferably 120° C. or higher. When the glass transition temperature of the polyester carbonate resin is within the above-described ranges, an optical lens produced by using the resin is sufficiently resistant to the surface treatment including hard coating. Note that glass transition temperatures of the polyester resin and the polyester carbonate resin can be easily set to be 110° C. or higher by suitably selecting a conventionally-known diol or dicarboxylic acid (e.g., a diol having a cyclic acetal skeleton or aromatic hydrocarbon group, a dicarboxylic acid having a naphthalene skeleton). Meanwhile, when the glass transition temperature is too high, the temperature at the time of molding the resin must be high, and the resin itself may be thermally decomposed unpredictably. Therefore, the glass transition temperature is preferably lower than 150° C.

The polystyrene equivalent weight-average molecular weight (Mw) is preferably 10000 to 100000, and more preferably 20000 to 50000.

When Mw is less than 10000, a resin molded body obtained tends to be fragile and therefore it is undesirable. When Mw is more than 100000, the melt viscosity increases, resulting in difficulty in taking out a resin from a mold at the time of molding, and in addition, the flowability is reduced, resulting in difficulty in injection molding in a molten state, and therefore it is undesirable.

The color phase of the solution (brightness; L value) is measured according to the method shown in the Examples, and is preferably 88 or more, and more preferably 95 to 99. When the L value is less than 88, the resin is more strongly colored, resulting in difficulty in use thereof as an optical material, and therefore it is undesirable.

The limiting viscosity and the semicrystallization time of the polyester carbonate resin of the embodiment are the same as those described in "2. Polyester resin" above.

Further, the resin of the embodiment preferably satisfies the below-described physical properties (1) and (2) simultaneously.

(1) According to the method for measuring a plastic transition temperature in accordance with JIS K7121, the measurement value of the middle point glass-transition temperature is 120° C. or higher.

(2) The measurement value of the limiting viscosity at 25° C. using a mixed solvent of phenol and 1,1,2,2-tetrachloroethane with a mass ratio of 6:4 is 0.2 to 1.0 dl/g.

<Molded Body of the Polyester Carbonate Resin>

The above-described polyester carbonate resin can be used for various applications. For example, it can be used for an injection molded body, a sheet, a film, an extrusion molded body such as a pipe, a bottle, a foam, an adhesive material, an adhesive and a paint. More specifically, the sheet may be either a single layer or a multilayer, and the film may also be either a single layer or a multilayer and may be unstretched or stretched in one direction or two directions, and may be laminated on a steel plate or the like. The bottle may be either a direct blow bottle or an injection blow bottle, and may be obtained by injection molding. The foam may be either a bead foam or an extruded foam. The polyester resin can be particularly preferably used for applications requiring high heat resistance and water vapor barrier properties, for example, products used in automobiles, packaging materials for import and export, electronic materials such as back sheets of solar cells, and food packaging materials for retorting or heating with a microwave oven.

In particular, by injection-molding the polyester carbonate resin of the embodiment into a lens shape using an injection molding machine or injection compression molding machine, an excellent optical lens can be obtained. At the time of obtaining an optical lens, in order to avoid mixing of a foreign material therein as much as possible, the molding environment must be a low-dust environment, and it is preferably Class 6 or lower, and more preferably Class 5 or lower.

The optical lens obtained by molding the polyester carbonate resin is preferably used in the form of an aspherical lens according to need. In the case of the aspherical lens, since the spherical aberration can be adjusted to be substantially zero by one lens, it is not necessary to remove the spherical aberration by combining a plurality of spherical lenses, and reduction in weight and reduction in the production cost can be carried out. Accordingly, the aspherical lens is particularly useful as a camera lens among optical lenses. The astigmatism of the aspherical lens is preferably 0 to 15 mλ, and more preferably 0 to 10 mλ.

To the surface of the optical lens obtained by molding the polyester carbonate resin, a coat layer such as an antireflection layer, a hard coat layer or the like may be provided according to need. The antireflection layer may be either a single layer or a multilayer, and may be made of either an organic substance or an inorganic substance, but is preferably made of an inorganic substance. Specific examples thereof include oxides and fluorides such as silicon oxide, aluminium oxide, zirconium oxide, titanium oxide, cerium oxide, magnesium oxide and magnesium fluoride.

The optical lens obtained by molding the polyester carbonate resin can be used as various lenses such as a pickup lens, an f-θ lens and a spectacle lens, but because of its high refractive index and low Abbe number, it can be particularly preferably used as a lens for correction of chromatic aberration. Specifically, the optical lens is preferably used as a lens of a single-lens reflex camera, a digital still camera, a video camera, a cellular phone with a camera, a disposable camera, a telescope, binoculars, a microscope, a projector or the like. When the optical lens obtained by using the polyester carbonate resin of the embodiment is a concave lens, it can be combined with another convex lens having a high Abbe number to be used as an optical lens system having a small chromatic aberration. The Abbe number of the convex lens to be combined is preferably 40 to 60, and more preferably 50 to 60.

EXAMPLES

Hereinafter, the present invention will be specifically described by way of examples, but the present invention is not limited thereto.
1. Polycarbonate Resin
(A) Examples of Polycarbonate Resin Measurement values of polycarbonate resins in the Examples were measured using the below-described methods and apparatuses.
1) Polystyrene equivalent weight-average molecular weight (Mw): Using gel permeation chromatograph (GPC) and tetrahydrofuran as a developing solvent, a calibration curve was produced using a standard polystyrene having an already-known molecular weight (molecular weight distribution=1). Based on this calibration curve, Mw was calculated from the GPC retention time.
[Measurement Conditions]
Apparatus: HLC-8320GPC manufactured by Tosoh Corporation
Column:
  Guard column: TSKguardcolumn SuperMPHZ-M×1
  Analysis column: TSKgel SuperMultiporeHZ-M×3
Solvent: tetrahydrofuran
Injection amount: 10 μL
Sample concentration: 0.2 w/v % tetrahydrofuran solution
Flow rate of solvent: 0.35 ml/min
Measurement temperature: 40° C.
Detector: RI
2) Refractive index (nD): The refractive index of a film having a thickness of 0.1 mm made of the polycarbonate resin produced in the Examples was measured according to the method of JIS-K-7142 using an Abbe's refractometer (23° C., wavelength: 589 nm). 3) Abbe number (v): Refractive indexes of a film having a thickness of 0.1 mm made of the polycarbonate resin produced in the Examples were measured at 23° C. and at wavelengths of 486 nm, 589 nm and 656 nm using an Abbe's refractometer, and the Abbe number was calculated using the below-described formula:

$$v=(nD-1)/(nF-nC)$$

nD: refractive index at a wavelength of 589 nm
nC: refractive index at a wavelength of 656 nm
nF: refractive index at a wavelength of 486 nm
4) Glass transition temperature (Tg): It was measured using a differential scanning calorimeter (DSC) (measurement apparatus: DSC7000X manufactured by Hitachi High-Tech Science Corporation).
5) Thermal decomposition initiation temperature (Td): The temperature at which the weight decreased by 5% was measured in an air stream using a differential thermal balance (TG-DTA). The temperature raising rate was 10° C./min (measurement apparatus: Simultaneous Thermogravimetric Analyzer STA7000 manufactured by Hitachi High-Tech Science Corporation).
6) Orientation birefringence (Δn): A cast film having a thickness of 0.1 mm was cut into a 5.0×5.0 cm square; after that, both the ends of the film were sandwiched between chucks (distance between the chucks: 3.0 cm); the film was stretched 1.5-fold at a temperature of Tg of the polycarbonate resin+5° C.; the phase difference (Re) at 589 nm was measured using an ellipsometer M-220 manufacture by JASCO Corporation; and after that, the orientation birefringence (Δn) was obtained from the below-described formula:

$$\Delta n = Re/d$$

Δn: orientation birefringence
Re: phase difference
d: thickness

Further, regarding the birefringence signs, the direction in which the refractive index becomes maximum in the surface of the above-described stretched film was obtained using an ellipsometer M-220 manufacture by JASCO Corporation, and the birefringence sign was judged from the relationship between the direction and the stretching direction.

In the case where the birefringence sign is positive: the stretching direction is a direction in which the refractive index becomes maximum in the film surface.

In the case where the birefringence sign is negative: the stretching direction is a direction perpendicular to a direction in which the refractive index becomes maximum in the film surface.
7) Total light transmittance: The total light transmittance of a film having a thickness of 0.1 mm made of the polycarbonate resin produced in the Examples was measured according to the method of JIS-K-7361-1 using a turbidimeter NDH2000 manufactured by Nippon Denshoku Industries Co., Ltd.
8) Amounts of residual phenol and residual diphenyl carbonate: 1.0 g of a polycarbonate resin was precisely weighed and dissolved in 10 ml of dichloromethane, and the mixture was gradually added to 100 ml of methanol with stirring to reprecipitate the resin. After the mixture was sufficiently stirred, a precipitate was separated by filtration, a filtrate was concentrated by an evaporator, and 1.0 g of a standard substance solution was precisely weighed and added to the obtained solid. 1 g of chloroform was further added thereto, and the diluted solution was quantified by means of GC-MS.
Standard substance solution: solution of 200 ppm trimethylol phenol in chloroform
Measurement apparatus (GC-MS): Agilent HP6890/5973MSD
Column: capillary column DB-5MS, 30 m×0.25 mm I.D., film thickness: 0.5 μm
Temperature raising conditions: 50° C. (5 min hold) to 300° C. (15 min hold), 10° C./min
Temperature of inlet: 300° C., Amount of injection: 1.0 μl (split ratio: 25)
Ionization method: EI method
Carrier gas: He, 1.0 ml/min
Aux temperature: 300° C.
Mass scanning range: 33 to 700

Example of the Production of Polycarbonate Resin (1)

Example 1

13.4 g (0.035 mol) of 2,2'-bis(2-hydroxyethoxy)-1,1'-binaphthalene (hereinafter sometimes abbreviated as "BHEBN"), 35.6 g (0.081 mol) of 9,9-bis(4-(2-hydroxyethoxy)phenyl)fluorene (hereinafter sometimes abbreviated as "BPEF"), 25.0 g (0.117 mol) of diphenyl carbonate (hereinafter sometimes abbreviated as "DPC") and $8.8 \times 10^5$ g ($1.0 \times 10^{-6}$ mol) of sodium hydrogen carbonate were put into a 300 ml four-neck flask equipped with a stirrer and a distillation apparatus, and it was heated to 180° C. under nitrogen atmosphere (760 mmHg). 10 minutes after the start of heating, complete dissolution of the raw materials was confirmed. After that, stirring was performed for 110 minutes under the same conditions. After that, the pressure reducing degree was adjusted to 200 mmHg, and simultaneously, the temperature was increased to 200° C. at a rate of 60° C./hr. During this, the start of distillation of by-produced phenol was confirmed. After that, the temperature was kept for 20 minutes to perform a reaction. Further, the temperature was increased to 230° C. at a rate of 75° C./hr, and 10 minutes after the end of the increase of the temperature, the temperature was kept while the pressure reducing degree was adjusted to 1 mmHg or less over 1 hour. After that, the temperature was increased to 240° C. at a rate of 60° C./hr, and a reaction was performed with stirring for 30 minutes. After the reaction was completed, nitrogen was blown into the reactor to adjust the pressure to ordinary pressure, and a polycarbonate resin produced was taken out therefrom. In the polycarbonate resin, the amount of residual phenol was 150 ppm, and the amount of residual DPC was 120 ppm.

Example 2

The operation was carried out in a manner similar to that in Example 1, except that the amounts of BHEBN, BPEF, DPC and sodium hydrogen carbonate were changed to 17.1 g (0.046 mol), 30.1 g (0.069 mol), 25.0 g (0.117 mol) and $8.7 \times 10^{-5}$ g ($1.0 \times 10^{-6}$ mol), respectively, and a polycarbonate resin produced was taken out. In the polycarbonate resin, the amount of residual phenol was 60 ppm, and the amount of residual DPC was 250 ppm.

Example 3

The operation was carried out in a manner similar to that in Example 1, except that the amounts of BHEBN, BPEF, DPC and sodium hydrogen carbonate were changed to 30.0 g (0.080 mol), 15.1 g (0.034 mol), 25.0 g (0.117 mol) and $8.7 \times 10^5$ g ($1.0 \times 10^{-6}$ mol), respectively, and a polycarbonate resin produced was taken out. In the polycarbonate resin, the amount of residual phenol was 120 ppm.

Example 4

The operation was carried out in a manner similar to that in Example 1, except that the amounts of BHEBN, BPEF, DPC and sodium hydrogen carbonate were changed to 38.9 g (0.104 mol), 5.07 g (0.012 mol), 25.0 g (0.117 mol) and $1.1 \times 10^{-4}$ g ($1.3 \times 10^{-6}$ mol), respectively, and a polycarbonate resin produced was taken out. In the polycarbonate resin, the amount of residual phenol was 100 ppm.

Reference Example 1

The operation was carried out in a manner similar to that in Example 1, except that the time of stirring performed under the same conditions after heating to 180° C. under nitrogen atmosphere (760 mmHg) and confirming complete dissolution of the raw materials was reduced from 110 minutes to 30 minutes and that the final pressure reducing degree was adjusted to 50 mmHg, and a polycarbonate resin produced was taken out. In the polycarbonate resin, the amount of residual phenol was 3500 ppm, and the amount of residual DPC was 1200 ppm.

Comparative Example 1

As a polycarbonate resin made of bisphenol A (hereinafter sometimes abbreviated as "BPA"), "Iupilon H-4000" (trade name, manufactured by Mitsubishi Engineering-Plastics Corporation, Mw=33,000, Tg=148° C.) was used.

Example (1) of the Production of Optical Film

Each of the polycarbonate resins obtained in Examples 1-4, Reference Example 1 and Comparative Example 1 was dissolved in methylene chloride to prepare a resin solution in which the solid component concentration was 5.3 wt %. This resin solution was poured into a mold for the production of a cast film, and released and dried after volatilization of methylene chloride, thereby preparing a cast film having a thickness of 0.1 mm. The refractive index (nD), the Abbe number (v) and the total light transmittance of the cast film were evaluated. Further, the obtained cast film was stretched 1.5-fold at a temperature of Tg+5° C. to evaluate the orientation birefringence (Δn).

Note that it was impossible to prepare a cast film when using the polycarbonate resin obtained in Reference Example 1 because it had a low molecular weight and was fragile.

In addition, the polystyrene equivalent weight-average molecular weight (Mw), the glass transition temperature (Tg) and the thermal decomposition initiation temperature (Td) of each of the resins obtained in the above-described Examples, Reference Example and Comparative Example were measured. The obtained values are shown in Table 1.

Further, the birefringence is shown in Table 2, and evaluation criteria of the orientation birefringence (Δn) in Table 2 are shown in Table 3.

ture was kept for 20 minutes to perform a reaction. Further, the temperature was increased to 230° C. at a rate of 75° C./hr, and 10 minutes after the end of the increase of the temperature, the temperature was kept while the pressure reducing degree was adjusted to 1 mmHg or less over 1 hour. After that, the temperature was increased to 240° C. at a rate of 60° C./hr, and a reaction was performed with stirring for 30 minutes. After the reaction was completed, nitrogen was blown into the reactor to adjust the pressure to ordinary pressure, and a polycarbonate resin produced was taken out therefrom.

TABLE 1

| | Composition ratio | | | Physical properties | | | | | | |
|---|---|---|---|---|---|---|---|---|---|---|
| | BHEBN mol % | BPEF mol % | BPA mol % | Mw | Tg ° C. | Td ° C. | nD | ν | Total light transmittance % | Amount of residual phenol ppm |
| Example 1 | 30 | 70 | — | 105000 | 141 | 368 | 1.647 | 22 | 89 | 150 |
| Example 2 | 40 | 60 | — | 44000 | 135 | 366 | 1.65 | 22 | 89 | 60 |
| Example 3 | 70 | 30 | — | 56000 | 123 | 363 | 1.659 | 21 | 88 | 120 |
| Example 4 | 90 | 10 | — | 53000 | 120 | 361 | 1.655 | 20 | 88 | 100 |
| Reference Example 1 | 30 | 70 | — | 4000 | 75 | 324 | — | — | — | 3500 |
| Comparative Example 1 | — | — | 100 | 33000 | 148 | — | 1.589 | 30 | 91 | 0 |

TABLE 2

| | Composition ratio | | | Birefringence | |
|---|---|---|---|---|---|
| | BHEBN mol % | BPEF mol % | BPA mol % | Orientation birefringence (Δn) | birefringence sign |
| Example 1 | 30 | 70 | — | $0.28 \times 10^{-3}$ | negative |
| Example 2 | 40 | 60 | — | $0.11 \times 10^{-3}$ | negative |
| Example 3 | 70 | 30 | — | $0.02 \times 10^{-3}$ | negative |
| Example 4 | 90 | 10 | — | $0.28 \times 10^{-3}$ | positive |
| Reference Example 1 | 30 | 70 | — | — | — |
| Comparative Example 1 | — | — | 100 | $9.5 \times 10^{-3}$ | positive |

TABLE 3

| Orientation birefringence Δn ($\times 10^{-3}$) | Evaluation |
|---|---|
| 0 to 0.1 | Extremely very small |
| More than 0.1 to 0.4 | Very small |
| More than 0.4 to 1.0 | Small |
| More than 1.0 | Large |

Example of the Production of Polycarbonate Resin (2)

Example 7

3.44 g (0.009 mol) of 2,2'-bis(2-hydroxyethoxy)-1,1'-binaphthalene (hereinafter sometimes abbreviated as "BHEBN"), 48.9 g (0.083 mol) of 9,9-bis(4-(2-hydroxyethoxy)-3-phenylphenyl)fluorene (hereinafter sometimes abbreviated as "BEPF"), 20.3 g (0.095 mol) of diphenyl carbonate (hereinafter sometimes abbreviated as "DPC") and $1.5 \times 10^{-4}$ g ($1.8 \times 10^{-6}$ mol) of sodium hydrogen carbonate were put into a 300 ml four-neck flask equipped with a stirrer and a distillation apparatus, and it was heated to 180° C. under nitrogen atmosphere (760 mmHg). 10 minutes after the start of heating, complete dissolution of the raw materials was confirmed. After that, stirring was performed for 110 minutes under the same conditions. After that, the pressure reducing degree was adjusted to 200 mmHg, and simultaneously, the temperature was increased to 200° C. at a rate of 60° C./hr. During this, the start of distillation of by-produced phenol was confirmed. After that, the tempera- Example 8

The operation was carried out in a manner similar to that in Example 7, except that the amounts of BHEBN, BEPF, DPC and sodium hydrogen carbonate were changed to 5.17 g (0.014 mol), 19.0 g (0.032 mol), 10.0 g (0.047 mol) and $9.7 \times 10^{-5}$ g ($1.2 \times 10^{-6}$ mol), respectively, and a polycarbonate resin produced was taken out.

Example 9

The operation was carried out in a manner similar to that in Example 7, except that the amounts of BHEBN, BEPF, DPC and sodium hydrogen carbonate were changed to 13.8 g (0.037 mol), 32.6 g (0.055 mol), 20.0 g (0.093 mol) and $1.5 \times 10^{-4}$ g ($1.8 \times 10^{-6}$ mol), respectively, and a polycarbonate resin produced was taken out.

Example 10

The operation was carried out in a manner similar to that in Example 7, except that the amounts of BHEBN, BEPF, DPC and sodium hydrogen carbonate were changed to 24.4 g (0.065 mol), 16.5 g (0.028 mol), 20.2 g (0.094 mol) and $1.6 \times 10^{-4}$ g ($1.9 \times 10^{-6}$ mol), respectively, and a polycarbonate resin produced was taken out.

Example 11

The operation was carried out in a manner similar to that in Example 7, except that the amounts of BHEBN, BEPF, DPC and sodium hydrogen carbonate were changed to 31.0 g (0.083 mol), 5.4 g (0.009 mol), 20.0 g (0.093 mol) and $1.5 \times 10^{-4}$ g ($1.8 \times 10^{-6}$ mol), respectively, and a polycarbonate resin produced was taken out.

Comparative Example 2

As a polycarbonate resin made of bisphenol A (hereinafter sometimes abbreviated as "BPA"), "Iupilon H-4000" (trade name, manufactured by Mitsubishi Engineering-Plastics Corporation, Mw=33,000, Tg=148° C.) was used.

Reference Example 2

24.4 g (0.065 mol) of BHEBN, 16.5 g (0.028 mol) of BPEF, 20.2 g (0.094 mol) of DPC and $1.6 \times 10^{-4}$ g ($1.9 \times 10^{-6}$ mol) of sodium hydrogen carbonate were put into a 300 ml four-neck flask equipped with a stirrer and a distillation apparatus, and it was heated to 180° C. under nitrogen atmosphere (760 mmHg). 10 minutes after the start of heating, complete dissolution of the raw materials was confirmed. After that, stirring was performed for 20 minutes under the same conditions. After that, the pressure reducing degree was adjusted to 200 mmHg, and simultaneously, the temperature was increased to 200° C. at a rate of 60° C./hr. During this, the start of distillation of by-produced phenol was confirmed. After that, the temperature was kept for 20 minutes to perform a reaction. Further, the temperature was increased to 230° C. at a rate of 75° C./hr, and 10 minutes after the end of the increase of the temperature, the temperature was kept while the pressure reducing degree was adjusted to 1 mmHg or less over 1 hour. After that, the temperature was increased to 240° C. at a rate of 60° C./hr, and a reaction was performed with stirring for 30 minutes. After the reaction was completed, nitrogen was blown into the reactor to adjust the pressure to ordinary pressure, and a polycarbonate resin produced was taken out therefrom.

<Example of the Production of Optical Film (2)>

Each of the polycarbonate resins obtained in Examples 7-11, Comparative Example 2 and Reference Example 2 was dissolved in methylene chloride to prepare a resin solution in which the solid component concentration was 5.3 wt %. This resin solution was poured into a mold for the production of a cast film, and released and dried after volatilization of methylene chloride, thereby preparing a cast film having a thickness of 0.1 mm. The refractive index (nD), the Abbe number (ν) and the total light transmittance of the cast film were evaluated. Further, the obtained cast film was stretched 1.5-fold at a temperature of Tg+5° C. to evaluate the orientation birefringence (Δn).

Note that it was impossible to prepare a cast film when using the polycarbonate resin obtained in Reference Example 2 because it had a low molecular weight and was fragile.

In addition, the polystyrene equivalent weight-average molecular weight (Mw), the glass transition temperature (Tg) and the thermal decomposition initiation temperature (Td) of each of the resins obtained in the above-described Examples, Comparative Example and Reference Example were measured. The obtained values are shown in Table 4. Further, the birefringence is shown in Table 5, and evaluation criteria of the orientation birefringence (Δn) in Table 5 are shown in Table 6.

TABLE 5

| | Composition ratio | | | Birefringence | |
| --- | --- | --- | --- | --- | --- |
| | BHEBN mol % | BEPF mol % | BPA mol % | Orientation birefringence (Δn) | birefringence sign |
| Example 7 | 10 | 90 | — | $0.60 \times 10^{-3}$ | negative |
| Example 8 | 30 | 70 | — | $0.41 \times 10^{-3}$ | negative |
| Example 9 | 40 | 60 | — | $0.29 \times 10^{-3}$ | negative |
| Example 10 | 70 | 30 | — | $0.02 \times 10^{-3}$ | positive |
| Example 11 | 90 | 10 | — | $0.21 \times 10^{-3}$ | positive |
| Comparative Example 2 | — | — | 100 | $9.5 \times 10^{-3}$ | positive |
| Reference Example 2 | 70 | 30 | — | — | — |

TABLE 6

| Orientation birefringence Δn (×10$^{-3}$) | Evaluation |
| --- | --- |
| 0 to 0.1 | Extremely very small |
| More than 0.1 to 0.4 | Very small |
| More than 0.4 to 1.0 | Small |
| More than 1.0 | Large |

(B) Examples of Polycarbonate Resin Composition

Measurement values of polycarbonate resin compositions in the Examples were measured using the below-described methods and apparatuses.

1) Polystyrene equivalent weight-average molecular weight (Mw): Using gel permeation chromatograph (GPC) and tetrahydrofuran as a developing solvent, a calibration curve was produced using a standard polystyrene having an already-known molecular weight (molecular weight distribution=1). Based on this calibration curve, Mw was calculated from the GPC retention time.

[Measurement conditions]
Apparatus: HLC-8320GPC manufactured by Tosoh Corporation
Column:
  Guard column: TSKguardcolumn SuperMPHZ-M×1
  Analysis column: TSKgel SuperMultiporeHZ-M×3
Solvent: tetrahydrofuran
Injection amount: 10 μL
Sample concentration: 0.2 w/v % tetrahydrofuran solution
Flow rate of solvent: 0.35 ml/min
Measurement temperature: 40° C.
Detector: RI

TABLE 4

| | Composition ratio | | | Physical properties | | | | | |
| --- | --- | --- | --- | --- | --- | --- | --- | --- | --- |
| | BHEBN mol % | BEPF mol % | BPA mol % | Mw — | Tg ° C. | Td ° C. | nD — | ν — | Total light transmittance % |
| Example 7 | 10 | 90 | — | 36000 | 152 | 364 | 1.656 | 21 | 87 |
| Example 8 | 30 | 70 | — | 47000 | 145 | 367 | 1.658 | 21 | 87 |
| Example 9 | 40 | 60 | — | 50000 | 141 | 367 | 1.659 | 21 | 87 |
| Example 10 | 70 | 30 | — | 39000 | 129 | 372 | 1.663 | 20 | 86 |
| Example 11 | 90 | 10 | — | 38000 | 120 | 373 | 1.666 | 19 | 86 |
| Comparative Example 2 | — | — | 100 | 33000 | 148 | — | 1.586 | 30 | 91 |
| Reference Example 2 | 70 | 30 | — | 2800 | 54 | 314 | — | — | — |

2) Glass transition temperature (Tg): It was measured using a differential scanning calorimeter (DSC) (measurement apparatus: DSC7000X manufactured by Hitachi High-Tech Science Corporation).

3) Refractive index (nD): The polycarbonate resin composition was press-molded to obtain a molded body (cuboid of 3 mm (thickness)×8 mm×8 mm), and the refractive index of the molded body was measured using a refractometer (KPR-200) manufactured by Shimadzu Corporation (23° C., wavelength: 589 nm).

4) Abbe number (v): The polycarbonate resin composition was press-molded to obtain a molded body (cuboid of 3 mm (thickness)×8 mm×8 mm), and refractive indexes of the molded body were measured at wavelengths of 486 nm, 589 nm and 656 nm using a refractometer (KPR-200) manufactured by Shimadzu Corporation. Further, the Abbe number was calculated using the below-described formula:

$v=(nD-1)/(nF-nC)$ nD: refractive index at a wavelength of 589 nm
nC: refractive index at a wavelength of 656 nm
nF: refractive index at a wavelength of 486 nm 5) Optical distortion: A molded piece having a thickness of 3 mm made of the polycarbonate resin composition was sandwiched between two polarizing plates, and light leakage from behind was visually observed according to the crossed-Nicol method to make evaluation. More specifically, each of the polycarbonate resin compositions obtained in Examples 13-17 and Comparative Examples 3-5 was injection-molded to obtain a molded piece having a diameter of 50 mm and a thickness of 3 mm using an injection molding machine ROBOSHOT S-2000i30A manufactured by FANUC Corporation. The molded piece was sandwiched between two polarizing plates, and light leakage from behind was visually observed according to the crossed-Nicol method to make evaluation. Rating in the evaluation is as follows:
A: Slight light leakage was observed.
B: Light leakage was observed.
C: Significant light leakage was observed.

(Synthesis Example 1: Production of Polycarbonate Resin (A1))

20.0 kg (53.4 mol) of 2,2'-bis(2-hydroxyethoxy)-1,1'-binaphthalene, 11.7 kg (54.5 mol) of diphenyl carbonate and 6.7×10$^{-2}$ g (8.0×10$^{-4}$ mol) of sodium hydrogen carbonate were put into a 50 L reactor equipped with a stirrer and a distillation apparatus, and it was heated to 200° C. over 1 hour under nitrogen atmosphere (760 mmHg) and stirred. After that, stirring was performed for 110 minutes under the same conditions. After that, the pressure reducing degree was adjusted to 200 mmHg over 20 minutes, and conditions were kept at 200° C. and 200 mmHg for 40 minutes to perform a transesterification reaction. Further, the temperature was increased to 230° C. at a rate of 45° C./hr, and conditions were kept at 230° C. and 200 mmHg for 10 minutes. After that, the pressure reducing degree was adjusted to 150 mmHg over 20 minutes, and conditions were kept at 230° C. and 150 mmHg for 10 minutes. After that, the pressure reducing degree was adjusted to 120 mmHg over 10 minutes, and conditions were kept at 230° C. and 120 mmHg for 70 minutes. After that, the pressure reducing degree was adjusted to 100 mmHg over 10 minutes, and conditions were kept at 230° C. and 100 mmHg for 10 minutes. Further, the pressure reducing degree was adjusted to 1 mmHg or less over 40 minutes, and stirring was performed under conditions of 230° C. and 1 mmHg or less for 30 minutes to perform a polymerization reaction. After the reaction was completed, nitrogen was blown into the reactor to increase the pressure, and a polycarbonate resin produced was taken out therefrom while being pelletized. Regarding the obtained polycarbonate resin (A1), Mw was 33000, Tg was 115° C., residual phenol was 300 ppm, and residual DPC was 250 ppm.

(Synthesis Example 2: Production of Polycarbonate Resin (B1))

19.5 kg (44.5 mol) of 9,9-bis(4-(2-hydroxyethoxy)phenyl)fluorene, 9.93 kg (46.3 mol) of diphenyl carbonate and 2.2×10$^{-2}$ g (2.7×10$^{-4}$ mol) of sodium hydrogen carbonate were put into a 50 L reactor equipped with a stirrer and a distillation apparatus, and it was heated to 215° C. over 1 hour under nitrogen atmosphere (760 mmHg) and stirred. After that, the pressure reducing degree was adjusted to 150 mmHg over 15 minutes, and conditions were kept at 215° C. and 15 mmHg for 20 minutes to perform a transesterification reaction. Further, the temperature was increased to 240° C. at a rate of 37.5° C./hr, and conditions were kept at 240° C. and 150 mmHg for 10 minutes. After that, the pressure reducing degree was adjusted to 120 mmHg over 10 minutes, and conditions were kept at 240° C. and 120 mmHg for 70 minutes. After that, the pressure reducing degree was adjusted to 100 mmHg over 10 minutes, and conditions were kept at 240° C. and 100 mmHg for 10 minutes. Further, the pressure reducing degree was adjusted to 1 mmHg or less over 40 minutes, and stirring was performed under conditions of 240° C. and 1 mmHg or less for 10 minutes to perform a polymerization reaction. After the reaction was completed, nitrogen was blown into the reactor to increase the pressure, and a polycarbonate resin produced was taken out therefrom while being pelletized. Regarding the obtained polycarbonate resin (B1), Mw was 25000, Tg was 146° C., residual phenol was 250 ppm, and residual DPC was 230 ppm.

Example 13

0.44 kg of the pellet of the polycarbonate resin (A1) produced in Synthesis Example 1, 4.57 kg of the pellet of the polycarbonate resin (B1) produced in Synthesis Example 2, 7.5 g of pentaerythritol tetrakis[3-(3,5-di-tert-butyl-4-hydroxyphenyl)propionate] and 7.5 g of monoglyceride stearate were mixed together with shaking well, and the mixture was kneaded and pelletized at 260° C. using an extruder to obtain 3.3 kg of a blend pellet. Tg of the pellet was 142° C., and no inflection point was found. The content of phenol in the pellet was 450 ppm. Further, Mw of the pellet was 25,000. The pellet was injection-molded to obtain a circular plate having a diameter of 50 mm and a thickness of 3 mm. The circular plate was transparent. The evaluation results are shown in Table 7.

Example 14

1.34 kg of the pellet of the polycarbonate resin (A1) produced in Synthesis Example 1, 3.66 kg of the pellet of the polycarbonate resin (B1) produced in Synthesis Example 2, 7.5 g of pentaerythritol tetrakis[3-(3,5-di-tert-butyl-4-hydroxyphenyl)propionate] and 7.5 g of monoglyceride stearate were mixed together with shaking well, and the mixture was kneaded and pelletized at 260° C. using an extruder to obtain 3.2 kg of a blend pellet. Tg of the pellet was 136° C., and no inflection point was found. Further, Mw of the pellet was 26,000. The content of phenol in the pellet was 350 ppm. The pellet was injection-molded to obtain a circular plate having a diameter of 50 mm and a thickness of 3 mm. The circular plate was transparent. The evaluation results are shown in Table 7.

Example 15

2.30 kg of the pellet of the polycarbonate resin (A1) produced in Synthesis Example 1, 2.70 kg of the pellet of the polycarbonate resin (B1) produced in Synthesis Example 2, 7.5 g of pentaerythritol tetrakis[3-(3,5-di-tert-butyl-4-hydroxyphenyl)propionate] and 7.5 g of monoglyceride stearate were mixed together with shaking well, and the mixture was kneaded and pelletized at 260° C. using an extruder to obtain 3.2 kg of a blend pellet. Tg of the pellet was 128° C., and no inflection point was found. Further, Mw of the pellet was 27,000. The content of phenol in the pellet was 370 ppm. The pellet was injection-molded to obtain a circular plate having a diameter of 50 mm and a thickness of 3 mm. The circular plate was transparent. The evaluation results are shown in Table 7.

Example 16

3.33 kg of the pellet of the polycarbonate resin (A1) produced in Synthesis Example 1, 1.67 kg of the pellet of the polycarbonate resin (B1) produced in Synthesis Example 2, 7.5 g of pentaerythritol tetrakis[3-(3,5-di-tert-butyl-4-hydroxyphenyl)propionate] and 7.5 g of monoglyceride stearate were mixed together with shaking well, and the mixture was kneaded and pelletized at 260° C. using an extruder to obtain 3.3 kg of a blend pellet. Tg of the pellet was 123° C., and no inflection point was found. Further, Mw of the pellet was 29,000. The content of phenol in the pellet was 450 ppm. The pellet was injection-molded to obtain a circular plate having a diameter of 50 mm and a thickness of 3 mm. The circular plate was transparent. The evaluation results are shown in Table 7.

Example 17

4.43 kg of the pellet of the polycarbonate resin (A1) produced in Synthesis Example 1, 0.58 kg of the pellet of the polycarbonate resin (B1) produced in Synthesis Example 2, 7.5 g of pentaerythritol tetrakis[3-(3,5-di-tert-butyl-4-hydroxyphenyl)propionate] and 7.5 g of monoglyceride laurate were mixed together with shaking well, and the mixture was kneaded and pelletized at 260° C. using an extruder to obtain 3.3 kg of a blend pellet. Tg of the pellet was 117° C., and no inflection point was found. Further, Mw of the pellet was 31,000. The content of phenol in the pellet was 380 ppm. The pellet was injection-molded to obtain a circular plate having a diameter of 50 mm and a thickness of 3 mm. The circular plate was transparent. The evaluation results are shown in Table 7.

Comparative Example 4

A pellet of a polycarbonate resin made of bisphenol A type polycarbonate resin "Iupilon H-4000" (trade name, manufactured by Mitsubishi Engineering-Plastics Corporation, Mw: 33000) was injection-molded to obtain a circular plate having a diameter of 50 mm and a thickness of 3 mm. The circular plate was transparent. The evaluation results are shown in Table 7.

Comparative Example 5

The pellet produced in Synthesis Example 1 was injection-molded to obtain a circular plate having a diameter of 50 mm and a thickness of 3 mm. The circular plate was transparent. The evaluation results are shown in Table 7.

Comparative Example 6

The pellet produced in Synthesis Example 2 was injection-molded to obtain a circular plate having a diameter of 50 mm and a thickness of 3 mm. The circular plate was transparent. The evaluation results are shown in Table 7.

TABLE 7

| Resin composition | Example 13 | Example 14 | Example 15 | Example 16 | Example 17 | Comparative Example 4 | Comparative Example 5 | Comparative Example 6 |
|---|---|---|---|---|---|---|---|---|
| Parts by weight of resin (A1) | 8.8 | 26.8 | 46 | 66.6 | 88.4 | — | 100 | — |
| Parts by weight of resin (B1) | 91.2 | 73.2 | 54 | 33.4 | 11.6 | — | — | 100 |
| Parts by weight of H4000 | — | — | — | — | — | 100 | — | — |
| Tg (° C.) | 142 | 136 | 128 | 123 | 117 | 146 | 115 | 146 |
| Refractive index nD | 1.642 | 1.646 | 1.652 | 1.659 | 1.665 | 1.586 | 1.668 | 1.639 |
| Abbe number ν | 23 | 22 | 21 | 20 | 19 | 30 | 19 | 24 |
| Optical distortion | B | A | A | A | A | C | B | B |

2. Polyester Resin

<Methods for Evaluating Polyester Resins>

Methods for evaluating polyester resins used in the Examples are as described below.

(1) Polystyrene equivalent weight-average molecular weight (Mw): Using gel filtration chromatograph (GPC) and chloroform as a developing solvent, a calibration curve was produced using a standard polystyrene having an already-known molecular weight (molecular weight distribution=1). Based on this calibration curve, Mw was calculated from the GPC retention time.

[Measurement Conditions]

Apparatus: HLC-8320GPC manufactured by Tosoh Corporation

Column:
  Guard column: TSKguardcolumn SuperMPHZ-M×1
  Analysis column: TSKgel SuperMultiporeHZ-M×3
Solvent: tetrahydrofuran
Injection amount: 10 μL
Sample concentration: 0.2 w/v % tetrahydrofuran solution
Flow rate of solvent: 0.35 ml/min
Measurement temperature: 40° C.
Detector: RI (2) Refractive Index, Abbe Number The polyester resin was dissolved in methylene chloride to prepare a resin solution in which the solid component concentration was 5.3 wt %. This resin solution was poured into a mold for the production of a cast film, and released and dried after volatilization of methylene chloride, thereby preparing a cast film having a thickness of 0.1 mm. The refractive index (nD) and the Abbe number (v) of the cast film were evaluated.

The refractive index was measured according to the method of JIS-K-7142 using a refractometer manufactured by Atago Co., Ltd. (25° C., wavelength: 589 nm). Regarding the Abbe number, refractive indexes were measured at wavelengths of 486 nm, 589 nm and 656 nm at 25° C. using a refractometer manufactured by Atago Co., Ltd., and the Abbe number was calculated using the below-described formula:

$$v=(nD-1)/(nF-nC)$$

nD: refractive index at a wavelength of 589 nm
nC: refractive index at a wavelength of 656 nm
nF: refractive index at a wavelength of 486 nm
(3) Glass transition temperature (Tg): It was measured using a differential scanning calorimeter (DSC) (measurement apparatus: DSC7000X manufactured by Hitachi High-Tech Science Corporation).

Example 18

1.00 mol of dimethyl terephthalate (hereinafter referred to as "DMT"), 2.20 mol of ethylene glycol, 0.10 mol of 9,9-bis[4-(2-hydroxyethoxy)phenyl]fluorene (hereinafter referred to as "BPEF") and 0.81 mol of 2,2'-bis(2-hydroxyethoxy)-1,1'-binaphthalene (hereinafter referred to as "BHEBN") were added to a glass flask equipped with a heating apparatus, a stirring blade, a partial condenser, a trap, a thermometer and a nitrogen gas introduction tube. The mixture was gradually heated and melted with stirring under nitrogen atmosphere in the presence of zinc acetate dihydrate in an amount of 0.023 mol % relative to the dicarboxylic acid component to perform an esterification reaction. After the reaction conversion rate of the dicarboxylic acid component became 90% or more, germanium oxide in an amount of 0.14 mol % and triethyl phosphate in an amount of 0.12 mol % relative to 100 mol % of the dicarboxylic acid component were added. The temperature was gradually increased and the pressure was gradually reduced, ethylene glycol was removed while reducing the pressure, and finally, polycondensation was performed at 250 to 280° C. and 0.1 kPa or less. After that, the content was taken out from the reactor, and a copolymerized polyester resin having a fluorene skeleton was obtained.

The polystyrene equivalent weight-average molecular weight of the obtained polyester resin was 42,000. Evaluation of physical properties is shown in Table 8.

Example 19

The operation was carried out in a manner similar to that in Example 1, except that the amounts of BPEF and BHEBN were changed to 0.27 mol and 0.63 mol, respectively, and that DMT was changed to dimethyl 2,6-naphthalenedicarboxylate (hereinafter abbreviated as "NDCM"). As a result, a polyester copolymer having a weight average molecular weight of 40,500 was obtained. Evaluation of physical properties is shown in Table 8.

Comparative Examples 7-10

A transesterification reaction and a polycondensation reaction were performed using the same apparatus and reaction conditions as those in Example 18 above, except that the raw materials and feed amounts were changed to those described in Table 8, and a copolymerized polyester resin was obtained. The results of evaluation of physical properties of the obtained resin are shown in Table 8.

TABLE 8

| | Copolymerization composition ratio | | | | | | | | Physical properties | | |
| | Dicarboxylic acid component (molar ratio) | | | | | Dihydroxy component (molar ratio) | | | | Refractive index (d line/ | |
| | DMT | DMI | DMN | FDPT | NDCM | EG | BPEF | BHEBN | Tg (° C.) | 25° C.) | Abbe number |
|---|---|---|---|---|---|---|---|---|---|---|---|
| Example 18 | 1.00 | | | | | 0.10 | 0.09 | 0.81 | 120 | 1.658 | 20 |
| Example 19 | | | | | 1.00 | 0.10 | 0.27 | 0.63 | 124 | 1.652 | 20 |
| Comparative Example 7 | | | | 1.00 | | 0.20 | 0.80 | | 122 | 1.634 | 23 |
| Comparative Example 8 | | | 0.50 | 0.50 | | 0.15 | 0.85 | | 137 | 1.645 | 22 |
| Comparative Example 9 | | | 0.75 | 0.25 | | 0.15 | 0.85 | | 151 | 1.652 | 21 |
| Comparative Example 10 | | 0.50 | 0.50 | | | 0.10 | 0.90 | | 150 | 1.650 | 21 |

DMT: dimethyl terephthalate
DMI: dimethyl isophthalate
DMN: dimethyl 2,6-naphthalenedicarboxylate
FDPT: 9,9-di(ethyl t-butoxycarboxylate)fluorene (9,9-di(carboxyethyl)fluorene or di-t-butyl ester of fluorene-9,9-dipropionic acid
NDCM: dimethyl naphthalenecarboxylate
EG: ethylene glycol
BPEF: 9,9-bis[4-(2-hydroxyethoxy)phenyl]fluorene
BHEBN: 2,2'-bis(2-hydroxyethoxy)-1,1'-binaphthalene 3. Polyester Carbonate Resin
<Methods for Evaluating Polyester Carbonate Resins>

Measurement values of polyester carbonate resins in the Examples were measured using the below-described methods and apparatuses.

1) Average molecular weights: Using gel permeation chromatograph (GPC) Shodex GPC-101 manufactured by Showa Denko K.K. and tetrahydrofuran as a developing solvent, a calibration curve was produced using a standard polystyrene having an already-known molecular weight (molecular weight distribution=1). Based on this calibration curve, the number-average molecular weight (Mn) and the weight-average molecular weight (Mw) were calculated from the GPC retention time.

[Measurement Conditions]

Apparatus: HLC-8320GPC manufactured by Tosoh Corporation

Column:
 Guard column: TSKguardcolumn SuperMPHZ-M×1
 Analysis column: TSKgel SuperMultiporeHZ-M×3

Solvent: tetrahydrofuran

Injection amount: 10 μL

Sample concentration: 0.2 w/v % tetrahydrofuran solution

Flow rate of solvent: 0.35 ml/min

Measurement temperature: 40° C.

Detector: RI

2) Glass transition temperature (Tg): 0.008 g of the produced resin was weighed and Tg was measured at a temperature raising rate of 10° C./min using a simultaneous thermogravimetric analyzer DSC220 manufactured by Seiko Instruments Inc.

3) Refractive index (nD): The polyester carbonate resin was press-molded to obtain a circular plate having a diameter of 40 mm and a thickness of 3 mm, and the refractive index of the circular plate was measured at 25° C. using a refractometer (KPR-200) manufactured by Shimadzu Device Corporation (wavelength: 589 nm).

4) Abbe number (v): The polyester carbonate resin was press-molded to obtain a circular plate having a diameter of 40 mm and a thickness of 3 mm, and refractive indexes were measured at wavelengths of 486 nm, 589 nm and 656 nm using a refractometer (KPR-200) manufactured by Shimadzu Device Corporation. Further, the Abbe number was calculated using the below-described formula:

$$v=(nD-1)/(nF-nC)$$

nD: refractive index at a wavelength of 589 nm
nC: refractive index at a wavelength of 656 nm
nF: refractive index at a wavelength of 486 nm 5) Color phase of solution: 6 g of the produced resin was dissolved in 60 ml of dichloromethane, and the L value (brightness) was measured using a quartz glass cell having an optical path length of 5.0 cm. As a color-difference meter, Spectro Color Meter SE2000 manufactured by Nippon Denshoku Industries Co., Ltd. was used.

Example 20

17.3 g (0.046 mol) of 2,2'-bis(2-hydroxyethoxy)-1,1'-binaphthalene (hereinafter sometimes abbreviated as "BHEBN"), 25.27 g (0.058 mol) of 9,9-bis(4-(2-hydroxyethoxy)phenyl)fluorene (hereinafter sometimes abbreviated as "BPEF"), 19.94 g (0.093 mol) of diphenyl carbonate (hereinafter sometimes abbreviated as "DPC") and 2.239 g (0.012 mol) of dimethyl terephthalate (hereinafter sometimes abbreviated as "DMT") were put into a 300 ml four-neck flask equipped with a stirrer and a distillation apparatus. After pressure reduction and nitrogen charging were repeated 5 times, it was heated at 180° C. under nitrogen atmosphere (760 mmHg). 10 minutes after the start of heating, complete dissolution of the raw materials was confirmed. After that, stirring was performed for 10 minutes under the same conditions. After that, the rotational speed was increased to 200 rpm, the pressure was reduced to 200 mmHg at a rate of 28 mmHg/min, and the temperature was increased to 260° C. at a rate of 60° C./hr. During this, the start of distillation of by-produced phenol was confirmed. After the pressure reached 200 mmHg and the temperature reached 260° C., the pressure was reduced at 10 mmHg/min, and 20 minutes after the pressure reached 0 mmHg, the reaction was completed. Finally, nitrogen was blown into the reactor to adjust the pressure to ordinary pressure, and a polyester carbonate resin produced was taken out therefrom.

Example 21

17.3 g (0.046 mol) of BHEBN, 25.27 g (0.058 mol) of BPEF, 19.94 g (0.093 mol) of DPC and 2.239 g (0.012 mol) of DMT were put into a 300 ml four-neck flask equipped with a stirrer and a distillation apparatus. After pressure reduction and nitrogen charging were repeated 5 times, it was heated at 180° C. under nitrogen atmosphere (760 mmHg). 10 minutes after the start of heating, complete dissolution of the raw materials was confirmed. After that, stirring was performed for 10 minutes under the same conditions. After that, the rotational speed was increased to 200 rpm, the pressure was reduced to 200 mmHg at a rate of 28 mmHg/min, and the temperature was increased to 240° C. at a rate of 60° C./hr. During this, the start of distillation of by-produced phenol was confirmed. After the pressure reached 200 mmHg and the temperature reached 240° C., the pressure was reduced at 10 mmHg/min, and 40 minutes after the pressure reached 0.8 mmHg, the reaction was completed. Finally, nitrogen was blown into the reactor to adjust the pressure to ordinary pressure, and a polyester carbonate resin produced was taken out therefrom.

Example 22

35.64 g (0.095 mol) of BHEBN, 4.615 g (0.011 mol) of BPEF, 20.00 g (0.093 mol) of DPC and 2.557 g (0.013 mol) of DMT were put into a 300 ml four-neck flask equipped with a stirrer and a distillation apparatus. After pressure reduction and nitrogen charging were repeated 5 times, it was heated at 180° C. under nitrogen atmosphere (760 mmHg). 10 minutes after the start of heating, complete dissolution of the raw materials was confirmed. After that, stirring was performed for 10 minutes under the same conditions. After that, the pressure was reduced to 200 mmHg at a rate of 28 mmHg/min, and the temperature was increased to 250° C. at a rate of 60° C./hr. During this, the start of distillation of by-produced phenol was confirmed. Finally, nitrogen was blown into the reactor to adjust the pressure to ordinary pressure, and a polyester carbonate resin produced was taken out therefrom.

Example 23

3.928 g (0.011 mol) of BHEBN, 41.95 g (0.096 mol) of BPEF, 20.34 g (0.095 mol) of DPC and 2.287 g (0.012 mol) of DMT were put into a 300 ml four-neck flask equipped with a stirrer and a distillation apparatus. After pressure reduction and nitrogen charging were repeated 5 times, it was heated at 180° C. under nitrogen atmosphere (760 mmHg). 10 minutes after the start of heating, complete dissolution of the raw materials was confirmed. After that, stirring was performed for 10 minutes under the same conditions. After that, the rotational speed was increased to 200 rpm, the pressure was reduced to 200 mmHg at a rate of 28 mmHg/min, and the temperature was increased to 260° C. at a rate of 60° C./hr. During this, the start of distillation of by-produced phenol was confirmed. After the pressure reached 200 mmHg and the temperature reached 260° C., the pressure was reduced at 1.6 mmHg/min. Finally, 20 minutes after the pressure reached 0.8 mmHg, the reaction was completed. Nitrogen was blown into the reactor to adjust the pressure to ordinary pressure, and a polyester carbonate resin produced was taken out therefrom.

Example 24

10.92 g (0.029 mol) of BHEBN, 33.41 g (0.076 mol) of BPEF, 20.10 g (0.093 mol) of DPC and 2.289 g (0.0118 mol) of DMT were put into a 300 ml four-neck flask equipped with a stirrer and a distillation apparatus. After pressure reduction and nitrogen charging were repeated 5 times, it was heated at 180° C. under nitrogen atmosphere (760 mmHg). 10 minutes after the start of heating, complete dissolution of the raw materials was confirmed. After that, stirring was performed for 10 minutes under the same conditions. After that, the rotational speed was increased to 200 rpm, the pressure was reduced to 200 mmHg at a rate of 4.6 mmHg/min, and the temperature was increased to 260° C. at a rate of 60° C./hr. During this, the start of distillation of by-produced phenol was confirmed. After the pressure reached 200 mmHg and the temperature reached 260° C., the pressure was reduced at 3.3 mmHg/min. 60 minutes after the pressure reached 0.8 mmHg, the reaction was completed. Finally, nitrogen was blown into the reactor to adjust the pressure to ordinary pressure, and a polyester carbonate resin produced was taken out therefrom.

Example 25

23.96 g (0.064 mol) of BHEBN, 17.61 g (0.040 mol) of BPEF, 19.84 g (0.093 mol) of DPC and 2.289 g (0.012 mol) of DMT were put into a 300 ml four-neck flask equipped with a stirrer and a distillation apparatus. After pressure reduction and nitrogen charging were repeated 5 times, it was heated at 180° C. under nitrogen atmosphere (760 mmHg). 10 minutes after the start of heating, complete dissolution of the raw materials was confirmed. After that, stirring was performed for 10 minutes under the same conditions. After that, the rotational speed was increased to 200 rpm, the pressure was reduced to 200 mmHg at a rate of 28 mmHg/min, and the temperature was increased to 260° C. at a rate of 60° C./hr. During this, the start of distillation of by-produced phenol was confirmed. After the pressure reached 200 mmHg and the temperature reached 260° C., the pressure was reduced at 3.3 mmHg/min. 30 minutes after the pressure reached 0.8 mmHg, the reaction was completed. Finally, nitrogen was blown into the reactor to adjust the pressure to ordinary pressure, and a polyester carbonate resin produced was taken out therefrom.

Comparative Example 11

12.94 g (0.035 mol) of BHBN, 24.77 g (0.057 mol) of BPEF, 20.09 g (0.094 mol) of DPC and 2.187 g (0.0113 mol) of DMT were put into a 300 ml four-neck flask equipped with a stirrer and a distillation apparatus. After pressure reduction and nitrogen charging were repeated 5 times, it was heated at 180° C. under nitrogen atmosphere (760 mmHg). 10 minutes after the start of heating, complete dissolution of the raw materials was confirmed. After that, stirring was performed for 10 minutes under the same conditions. After that, the rotational speed was increased to 200 rpm, the pressure was reduced to 200 mmHg at a rate of 28 mmHg/min, and the temperature was increased to 260° C. at a rate of 60° C./hr. During this, the start of distillation of by-produced phenol was confirmed. After the pressure reached 200 mmHg and the temperature reached 260° C., the pressure was reduced at 10 mmHg/min. After the pressure reached 0.8 mmHg, the reaction was completed. Nitrogen was blown into the reactor to adjust the pressure to ordinary pressure, and a polyester carbonate resin produced was taken out therefrom.

Comparative Example 12

26.80 g (0.072 mol) of BHBN, 4.544 g (0.0104 mol) of BPEF, 19.98 g (0.093 mol) of DPC and 2.236 g (0.0115 mol) of DMT were put into a 300 ml four-neck flask equipped with a stirrer and a distillation apparatus. After pressure reduction and nitrogen charging were repeated 5 times, it was heated at 180° C. under nitrogen atmosphere (760 mmHg). 10 minutes after the start of heating, complete dissolution of the raw materials was confirmed. After that, stirring was performed for 10 minutes under the same conditions. The rotational speed was increased to 200 rpm, the pressure was reduced to 200 mmHg at a rate of 28 mmHg/min, and the temperature was increased to 260° C. at a rate of 60° C./hr. During this, the start of distillation of by-produced phenol was confirmed. After the pressure reached 200 mmHg and the temperature reached 260° C., the pressure was reduced at 10 mmHg/min. After the pressure reached 0.8 mmHg, the reaction was completed. Nitrogen was blown into the reactor to adjust the pressure to ordinary pressure, and a polyester carbonate resin produced was taken out therefrom.

Note that it was impossible to press-mold the resins of Comparative Examples 11 and 12, and therefore the refractive index and the Abbe number thereof were not measured.

TABLE 9

| | Copolymerization composition ratio | | | | Evaluation results | | | | | |
| --- | --- | --- | --- | --- | --- | --- | --- | --- | --- | --- |
| | Dicarboxylic acid component (mol %) | Dihydroxy component (mol %) | | | Refractive index (d line/ 25° C.) | Abbe number | Molecular weight | | glass transition temperature | Brightness |
| | DMT | BHEBN | BHBN | BPEF | nD | ν | Mn | Mw | Tg (° C.) | L |
| Example 20 | 10 | 40 | | 50 | 1.650 | 21 | 16600 | 33000 | 133 | 94.7 |
| Example 21 | 10 | 40 | | 50 | 1.653 | 21 | 12400 | 24200 | 134 | 95.1 |
| Example 22 | 11 | 80 | | 9 | 1.653 | 19 | 6800 | 12400 | 118 | 95.2 |
| Example 23 | 10 | 9 | | 81 | 1.647 | 23 | 16800 | 37000 | 149 | 95.0 |
| Example 24 | 10 | 25 | | 65 | 1.646 | 22 | 16900 | 37100 | 144 | 89.1 |
| Example 25 | 10 | 55 | | 35 | 1.650 | 21 | 17300 | 40600 | 135 | 97.6 |

TABLE 9-continued

| | Copolymerization composition ratio | | | | Evaluation results | | | | | |
|---|---|---|---|---|---|---|---|---|---|---|
| | Dicarboxylic acid component (mol %) | Dihydroxy component (mol %) | | | Refractive index (d line/ 25° C.) | Abbe number | Molecular weight | | glass transition temperature | Brightness |
| | DMT | BHEBN | BHBN | BPEF | nD | ν | Mn | Mw | Tg (° C.) | L |
| Comparative Example 11 | 10 | — | 40 | 50 | — | — | 2600 | 3700 | — | 69.2 |
| Comparative Example 12 | 10 | — | 81 | 9 | — | — | 1400 | 1600 | 110 | 26.2 |

DMT: dimethyl terephthalate,
BHEBN: 2,2'-bis(2-hydroxyethoxy)-1,1'-binaphthalene
BHBN: 2,2'-bis(2-hydroxy)-1,1'-binaphthalene
BPEF: 9,9-bis[4-(2-hydroxyethoxy)phenyl]fluorene

The invention claimed is:

1. A polyester carbonate resin, comprising:
a structural unit derived from a compound represented by general formula (1) below:

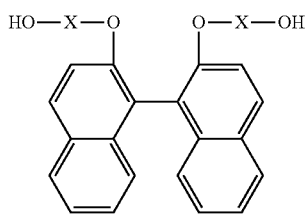

(1)

wherein X represents a $C_2$ alkylene group;
a structural unit derived from a compound represented by general formula (2a) below:

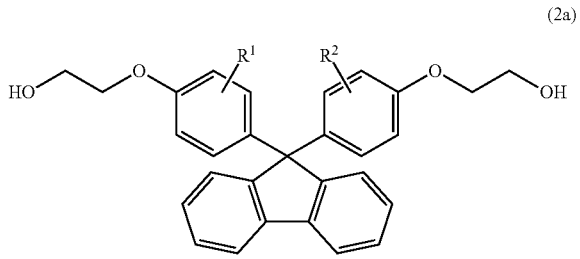

(2a)

wherein $R^1$ and $R^2$ each independently represent a hydrogen atom, a $C_{1-20}$ alkyl group, a $C_{1-20}$ alkoxyl group, a $C_{5-20}$ cycloalkyl group, a $C_{5-20}$ cycloalkoxyl group, a $C_{6-20}$ aryl group or a $C_{6-20}$ aryloxy group;

a structural unit derived from a terephthalic acid or an ester thereof;

a structural unit derived from a carbonic acid diester; and wherein the polyester carbonate resin has a polystyrene equivalent weight-average molecular weight (Mw) of 14,000 to 100,000.

2. The polyester carbonate resin according to claim 1, wherein $R^1$ and $R^2$ are hydrogen atoms.

3. The polyester carbonate resin according to claim 1, wherein in structural units derived from a dihydroxy compound in the polyester carbonate resin, the ratio of the structural unit derived from the compound represented by general formula (1) is 9 to 80 mol % and the ratio of the structural unit derived from the compound represented by general formula (2a) is 9 to 81 mol %.

4. The polyester carbonate resin according to claim 1, which has a refractive index of 1.645 to 1.660.

5. An optical member comprising the polyester carbonate resin according to claim 1.

6. The optical member according to claim 5, which is an optical lens of a single-lens reflex camera, a digital still camera, a video camera, a cellular phone with a camera, a disposable camera, a telescope, binoculars, a microscope or a projector.

* * * * *